Figure 5B:
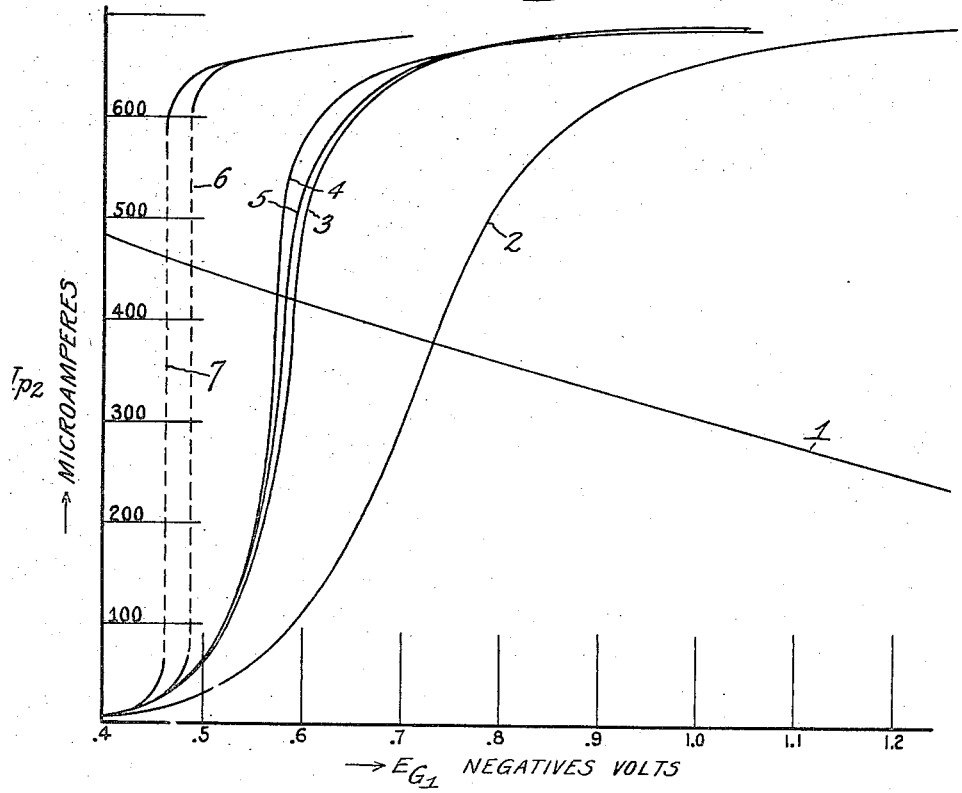

Feb. 25, 1936.                S. Y. WHITE                2,032,193
                          ELECTRON TUBE SYSTEM
             Filed July 29, 1929         14 Sheets-Sheet 1
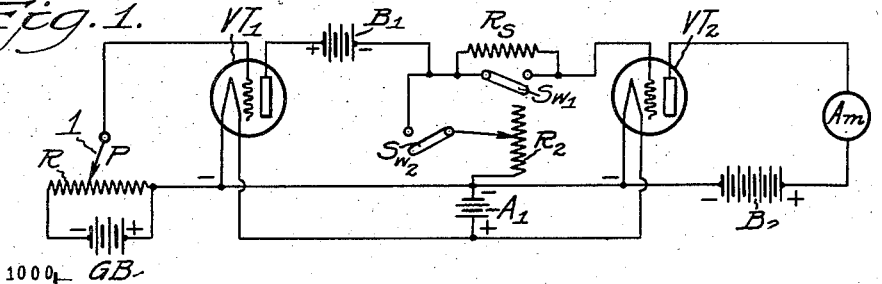
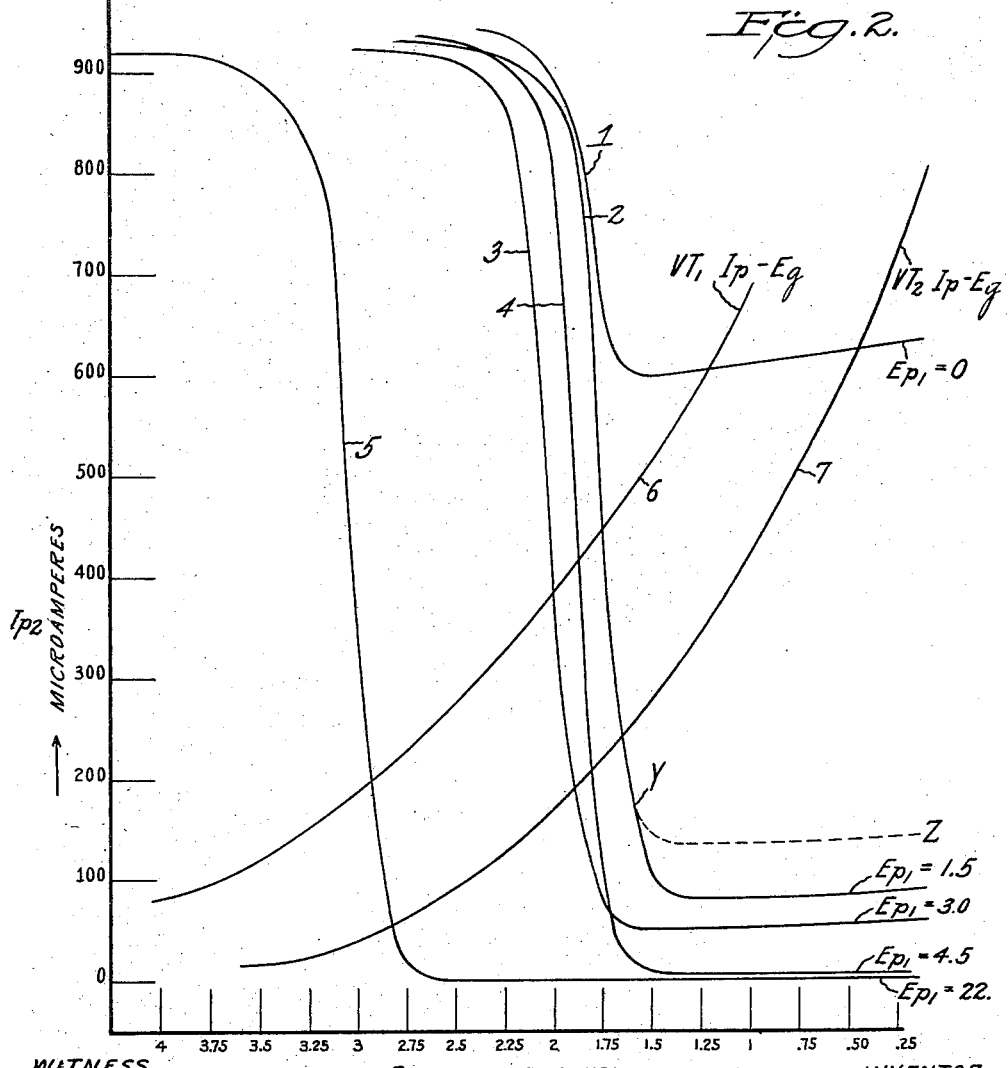
WITNESS                                         INVENTOR
                                              SIDNEY Y. WHITE
                          By  Attorney

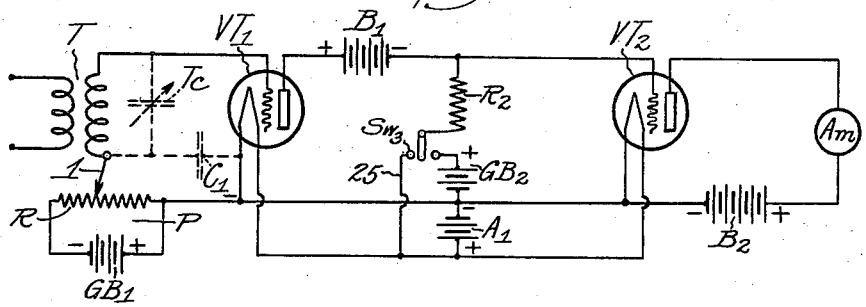
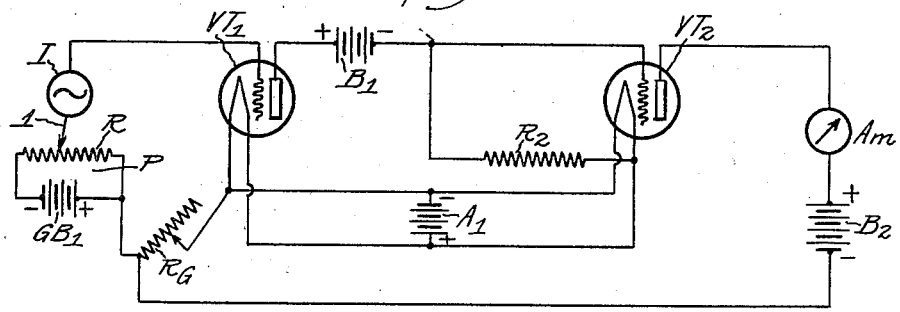
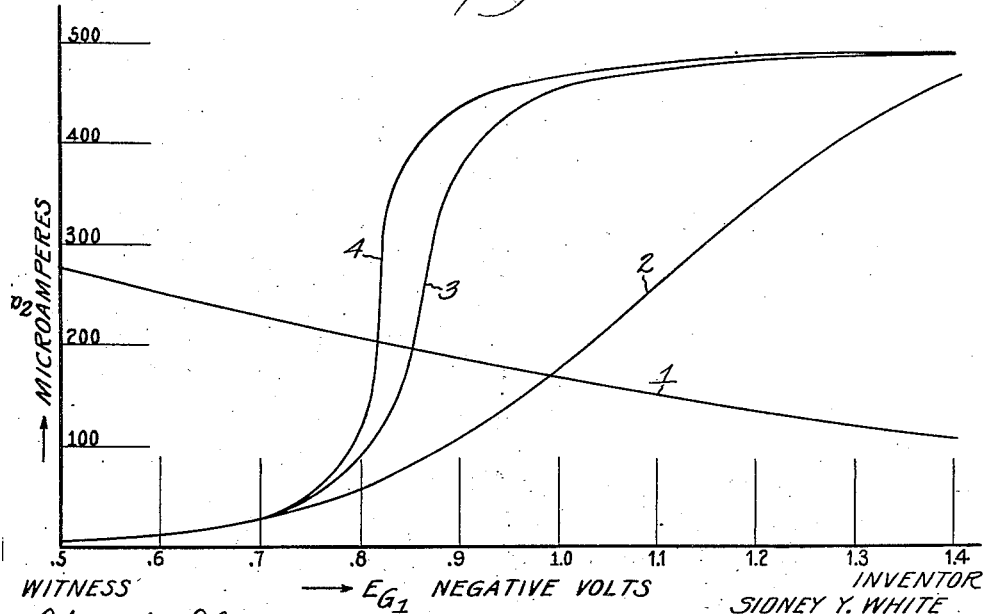

Feb. 25, 1936.　　　　S. Y. WHITE　　　　2,032,193
ELECTRON TUBE SYSTEM
Filed July 29, 1929　　　14 Sheets-Sheet 3

WITNESS

Inventor
SIDNEY Y. WHITE
By Attorney

Feb. 25, 1936.  S. Y. WHITE  2,032,193

ELECTRON TUBE SYSTEM

Filed July 29, 1929  14 Sheets-Sheet 4

WITNESS
Oliver W. Holmes

Inventor
SIDNEY Y. WHITE
By Attorney

Feb. 25, 1936.  S. Y. WHITE  2,032,193

ELECTRON TUBE SYSTEM

Filed July 29, 1929  14 Sheets-Sheet 6

WITNESS
Oliver W. Holmes

Inventor
SIDNEY Y. WHITE
By Attorney

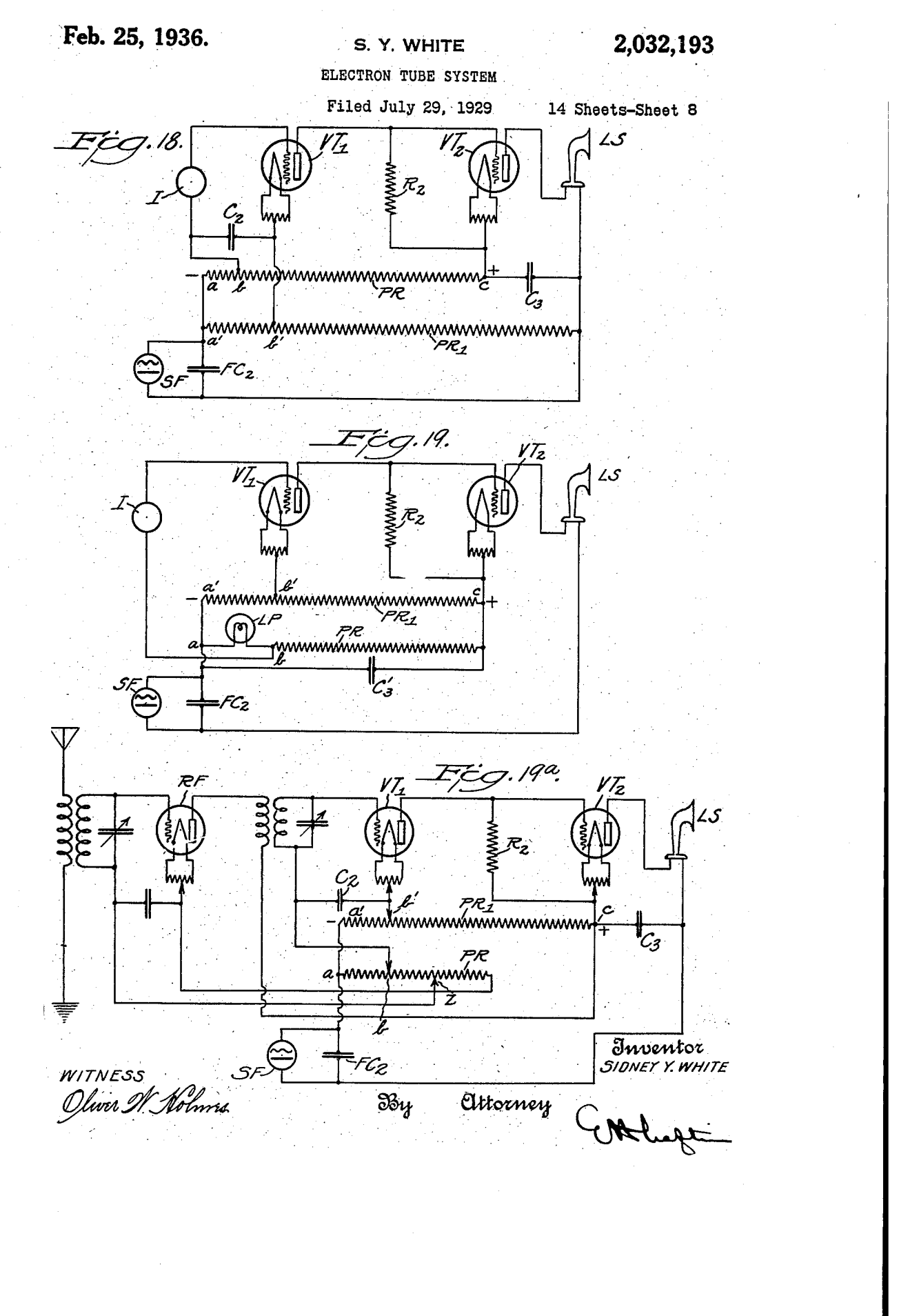

Feb. 25, 1936.  S. Y. WHITE  2,032,193
ELECTRON TUBE SYSTEM
Filed July 29, 1929  14 Sheets-Sheet 9

Inventor
SIDNEY Y. WHITE
By Attorney

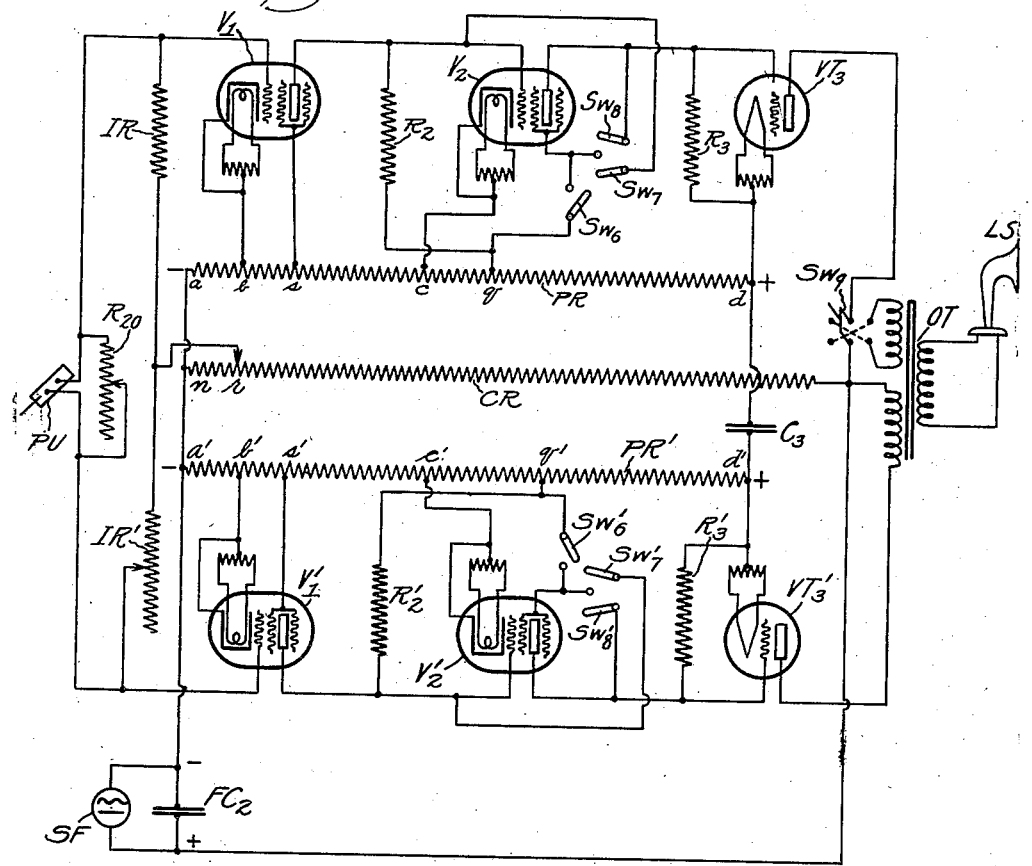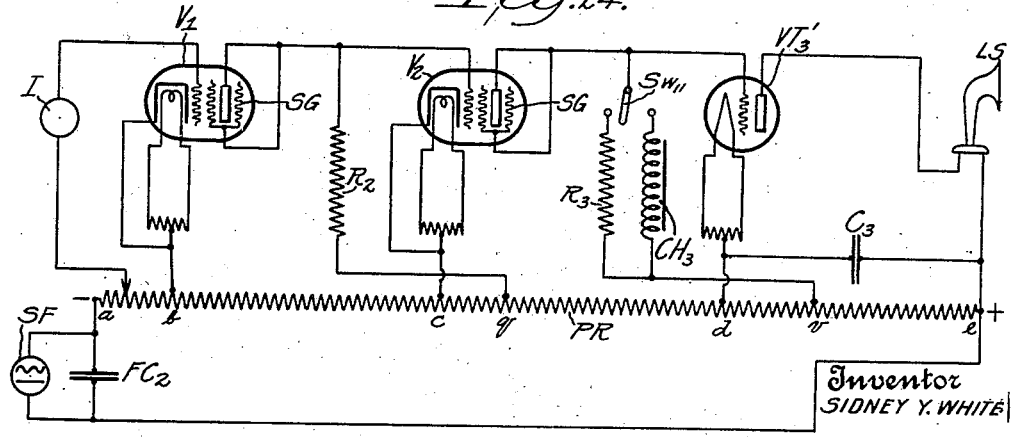

Feb. 25, 1936.  S. Y. WHITE  2,032,193
ELECTRON TUBE SYSTEM
Filed July 29, 1929  14 Sheets-Sheet 11
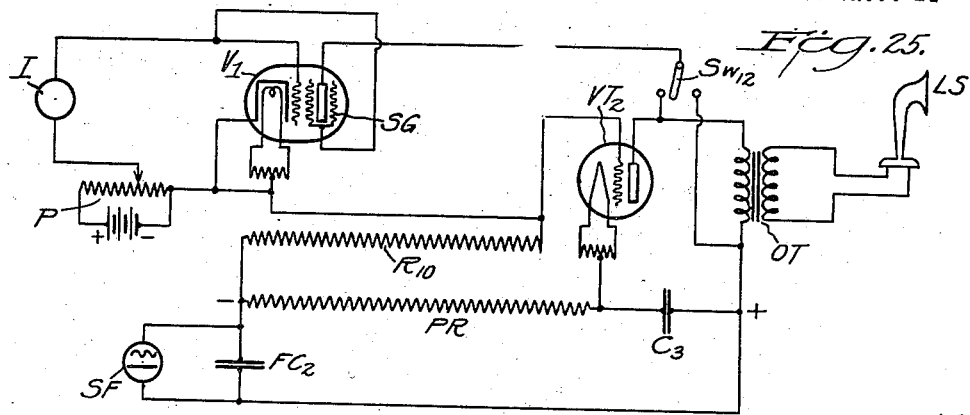
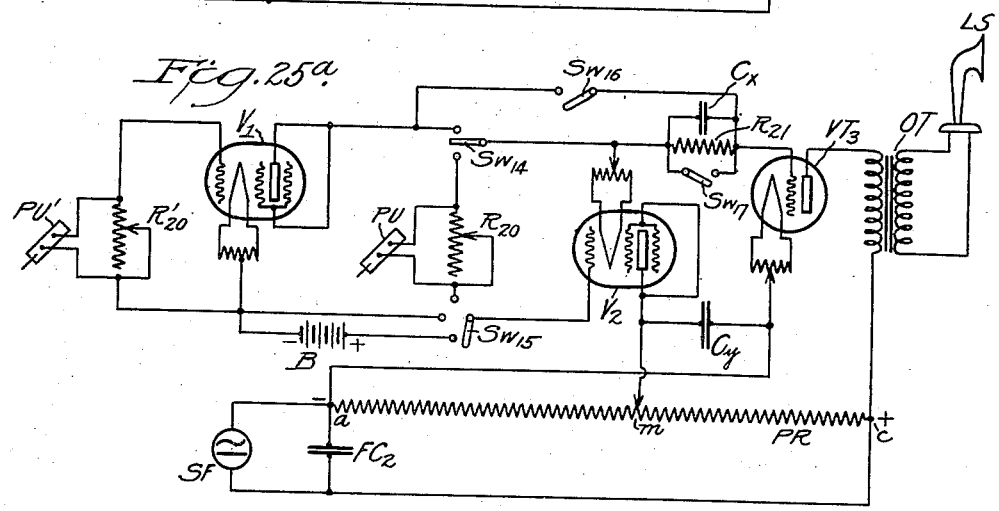
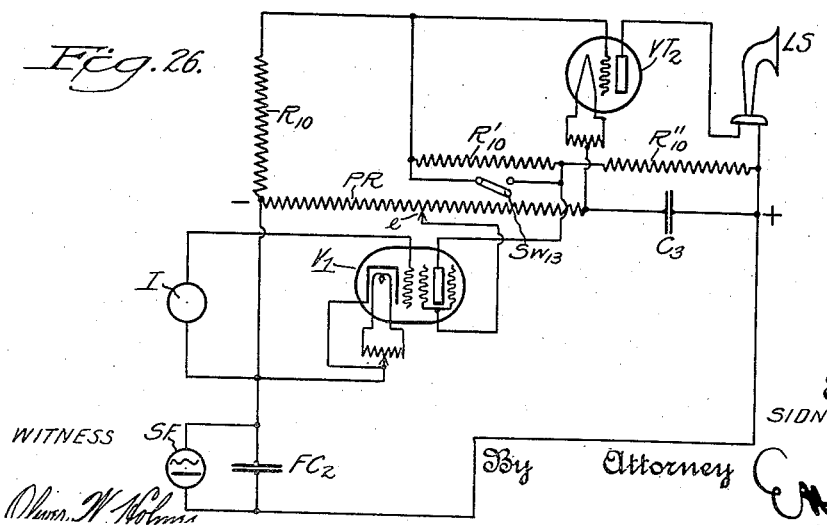
Inventor
SIDNEY Y. WHITE Inventor
SIDNEY Y. WHITE Feb. 25, 1936.   S. Y. WHITE   2,032,193
ELECTRON TUBE SYSTEM
Filed July 29, 1929   14 Sheets-Sheet 13

WITNESS

Inventor
SIDNEY Y. WHITE
By Attorney

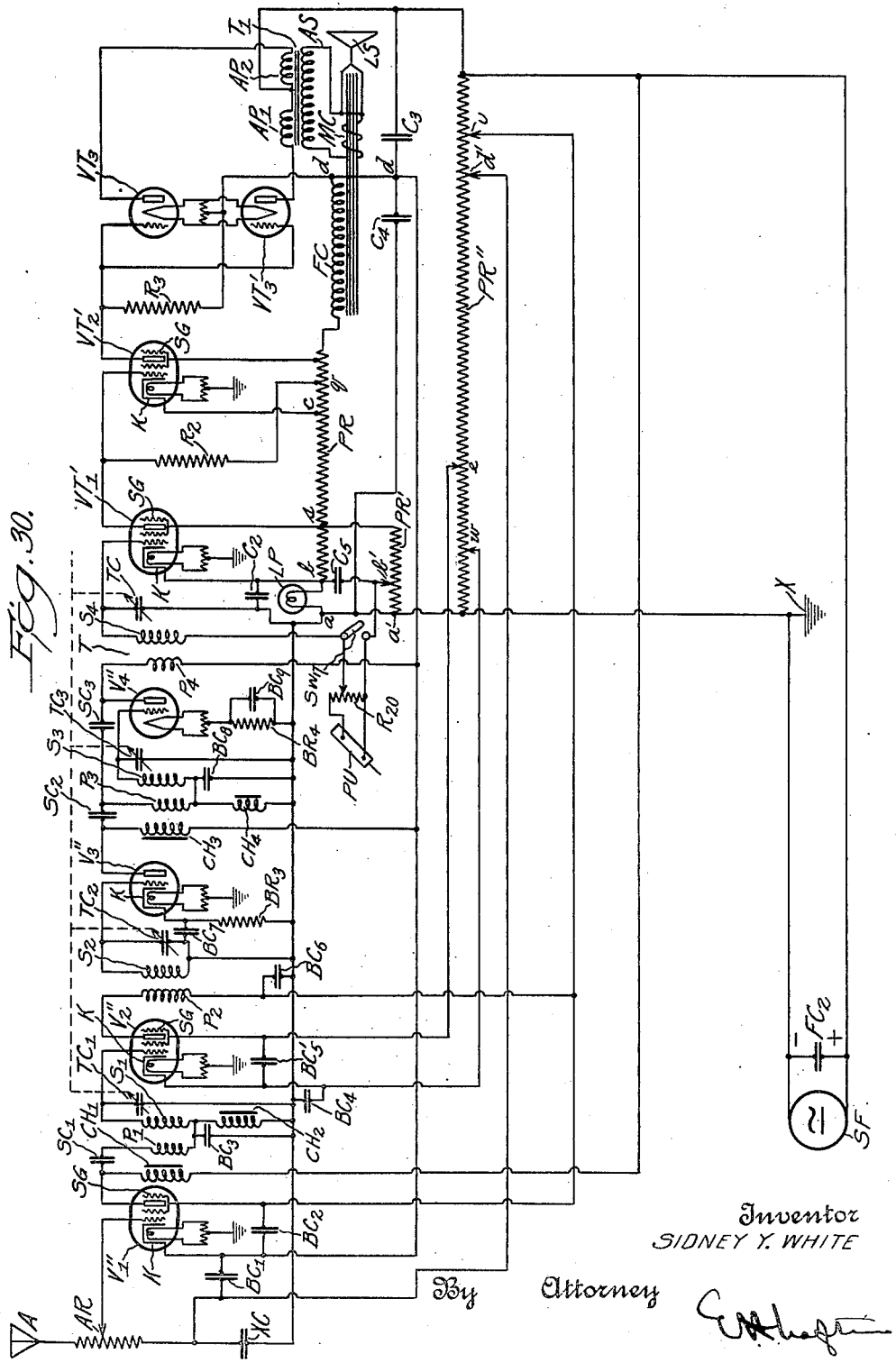

Patented Feb. 25, 1936

2,032,193

UNITED STATES PATENT OFFICE 2,032,193

ELECTRON TUBE SYSTEM

Sidney Y. White, New York, N. Y., assignor, by mesne assignments, to Radio Corporation of America, New York, N. Y., a corporation of Delaware Application July 29, 1929, Serial No. 381,754

27 Claims. (Cl. 179—171)

The present invention relates generally to electrical relay, repeater, detector, amplifier, and detector-amplifier systems for high and low frequencies including radio frequencies, and particularly to such systems including and relying upon the actions of plural electrode thermionic discharge devices. It is in part a continuation of, and includes in particular improvements over and modifications in, the systems disclosed in my copending application Serial Number 211,292, filed August 8, 1927 patented Jan. 20, 1931, No. 1,789,664.

The systems of the invention employ a plurality of thermionic devices, three electrode vacuum tubes for example, connected in cascade, and because I connect the devices one to another without the interposition of reactive elements, such as transformers, inductive or capacitive impedance elements, and condensers, I term the systems "direct-coupled"; however, in view of the aperiodic quality of the thermionic devices and the non-reactive character of the couplings between them the systems may be appropriately termed "aperiodic".

Typical objects of the systems of the invention are the amplification of direct current effects, alternating currents such as sound representing currents, and the detection and amplification of high frequency currents modulated at lower frequency, though the descriptions of the various systems of the invention to follow make obvious that they are capable of many applications in the general treatment of and practice with electrical effects.

Particularly advantageous features of the direct coupled systems of the invention are freedom from distortion and phase displacement irrespective of current frequencies being handled due to the absence of reactive elements in the linking circuits, and freedom from harmonic generation due to absence of iron or like magnetic material usual to transformer and inductive impedance coupled amplifiers of general usage. A further advantage is the facilitating through absence of distortion and phase displacement of "hum" elimination in systems involving the energizing of the thermionic devices from commercial alternating current sources.

A particular object of the invention is the insuring of substantially uniform amplification for currents of all frequencies over given wide bands of frequencies, such as the audio frequency band necessary to perfect amplification of sound representing current before reproduction.

Another object is the securing of very high orders of amplification while maintaining stable operation, freedom from oscillation generation, freedom from troublesome signal regeneration or degeneration, avoidance of pick-up of unwanted electrical disturbances, and like effects generally characteristic of highly amplifying systems of reactive construction.

Outstanding features of the systems of the invention are the absence of bulky and expensive elements, and the permissible closeness of location of elements without troublesome reactions, thus providing for assembly constructions heretofore unapproached in compactness, weight and cost while handling high amplification and large energy control hitherto not arrived at with other systems. These features are further enhanced when energizing the thermionic devices from alternating current sources by the small amount of apparatus needed in an associated rectifying and filter system because of most favorable characteristics for obliterating or rendering non-effective so-called "hum currents" imposed upon the systems in such energizing.

As is pointed out in detail in the descriptive matter following I usually employ output thermionic devices capable of and operated to handle large energy for fully satisfying the operating energy demands of translating devices, such as loud speakers, but for the preceding thermionic devices of the cascade organizations I prefer those designed to have very high internal impedances, so-called high amplification three electrode tubes for example, and so operate such devices as to increase the internal impedances well beyond those normal to the usual operation of such tubes.

For example, I may employ a commercial design of three electrode tube having an amplification constant (termed "mu") of 30 which, according to prescribed and usual operation, has its plate electrode energized at 180 volts to produce a space current of the order of one or more milliamperes, or an internal impedance of the order of .1 to .2 megohms. With my use of such a tube I may energize the plate electrode with potentials of the order of 10, or even less, volts producing a space current of but a few microamperes, thus increasing the tube internal impedance to several megohms.

Because of the effectiveness of the principle of matching internal and external impedances for efficiency of operation of electrical devices the exceedingly high internal impedances of the preceding tubes in my systems forbid the use of reactive devices, such as transformers, inductive impedances and condensers, as coupling devices or aids thereto between successive stages in the systems owing to the impossibility of constructing such devices to produce impedances approaching megohm values. I therefore resort to resistance elements at locations where high impedances are needed, and happily these locations are such that the needed current flow through the resistances is extremely low, a few microamperes for example, so that the resistances can be very simple, small and inexpensive without fear of destruction from overheating. For example I use the simple commercial resistances of the order of ¼ megohm, and above, which have long been used extensively as so-called "grid-leaks" for vacuum tube detectors.

As a practical observation I have found that the commercial types of grid-leak resistances increase their resistance values with age and use to something of the order of 150% of original resistance values, and, quite often, those originally constructed to have resistance values above 1 megohm will eventually open to become substantially infinite in resistance.

While in some of my practice I can use to advantage resistances considerably in excess of 1 megohm, yet as a practical matter the difference between operation at 1 megohm and several megohms has proven minor, so that I have in general confined my practical designs to resistance elements not exceeding 1 megohm values, as is later pointed out. Further, since the efficiency of my systems is generally improved by higher resistance values, systems built with unaged resistances will improve in efficiency with increase of resistance values with age. At the same time the systems can be so designed that the change of resistance that takes place will not interfere with correct operation.

As a further practical observation it is pointed out that because of direct coupling throughout the systems they are direct current amplifiers, so that any change in the conditions or actions of one portion or stage of the system to alter direct current flow or effects therein is not locally confined or limited as in the usual multi-stage amplifier systems, but makes its effects felt throughout the entire system. For example, the substitution of one tube for another of like make but having a different degree of filament emission will alter the amount of tube space current, or direct current flow, resulting in changing internal impedance of the tube and potentials here and there, which effects are amplifiedly manifested throughout the entire system. It is a feature of the present invention that I control these effects, and further include means for the automatic control of them so effective as to permit of tolerances well beyond the requirements for commercial quantity production of such elements as my systems may need for correct assembly.

The automatic control of the direct current effects is further of great importance and practical necessity in installations intended for unskilled or unattended operation, and particularly in connection with operation for detection and amplification of high frequency modulated signals, a broadcast radio receiver being a good example of such requirement. Since the systems may be employed in the function of detection of such signals rectification of the carrier currents must take place, which rectification biases or changes the grid potentials, thereby sending direct current effects throughout the system, and this in proportion to the intensity of the carrier current.

For example in planned best reproduction from a broadcast receiver the power amplifier or output tube is adjusted to operate in its signal reproduction activity from the mid-point of the straight portion of the plate current characteristic curve in the presence of an adequate grid bias potential, and no difficulty is presented as to this feature with the usual form of detector and amplifier systems. However, with the direct-coupled detector-amplifier system the rectification of the carrier current impressed upon the input of the first tube sends an amplified direct current effect through the system to alter the plate current of the last tube in proportion to the strength of the carrier current, and without any automatic corrective means it does not require a very strong signal to drive the plate current of the power amplifier tube off the straight portion of the characteristic curve. The automatic corrective features of my invention therefore constitute an important element thereof.

Other objects, features and advantages of my invention are apparent from the detailed description that follows. No limitations are intended by confining myself to specific embodiments thereof for explanatory purposes. Because the modes and features of operation of my systems involve radical departures from the usual conceptions and practices in the operation of thermionic devices I state the descriptive matter and observations in considerable detail around actual assemblies of elements in many cases of well-known commercial construction and commonly understood characteristics.

In the figures of the accompanying drawings like reference characters represent corresponding elements so far as possible throughout the several figures.

Fig. 1 diagrammatically illustrates one fundamental arrangement of my improved electron tube systems suitably connected for investigation of the operational characteristics thereof.

Fig. 2 includes graphs of the operational characteristics of the system illustrated in Fig. 1.

Fig. 3 diagrammatically illustrates the system of Fig. 1 modified to operate as a detector-amplifier system.

Fig. 4 diagrammatically illustrates a modification of the system of Fig. 3, incorporating therein a system for regeneration of the amplified currents.

Figs. 5a and 5b include graphs of the operational characteristics of the system of Fig. 4.

Figure 6:
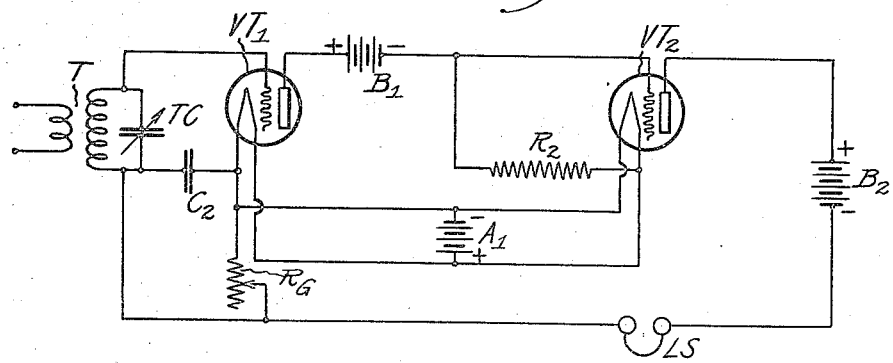

Fig. 6 diagrammatically illustrates the system of Fig. 4 to include a frequency selective impedance.

Figure 7:
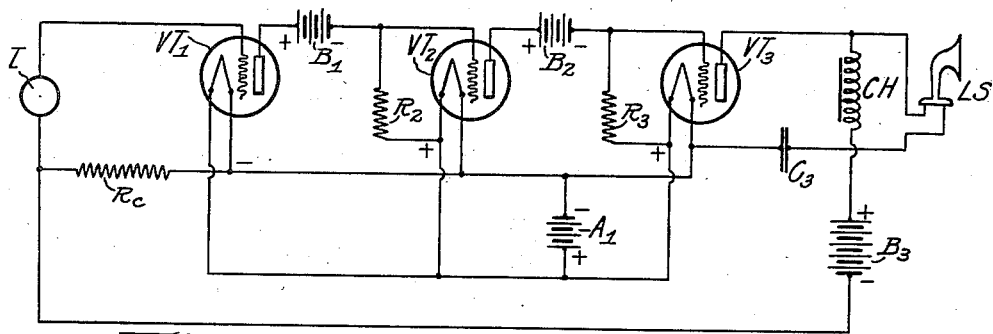

Fig. 7 diagrammatically illustrates extension of the system of Fig. 4 to one of an odd number of tubes, and provided with an automatic grid bias modifier and system stabilizer.

Figure 8:
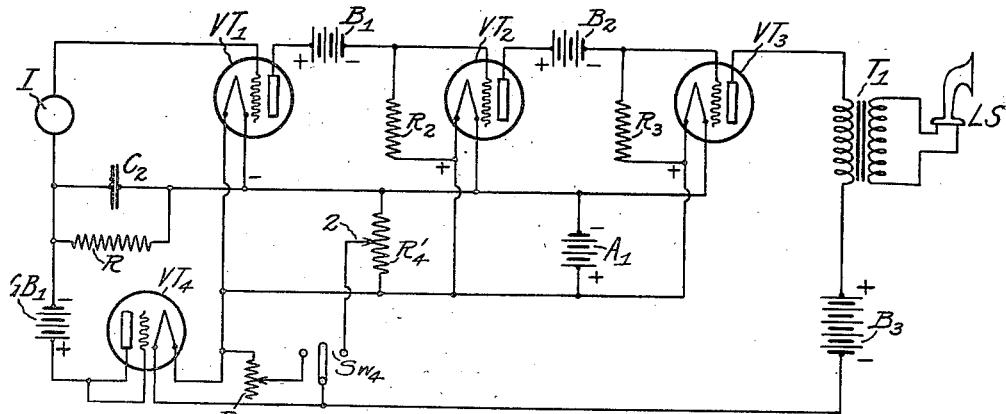

Fig. 8 diagrammatically illustrates a modification of the system of Fig. 7.

Figure 9:
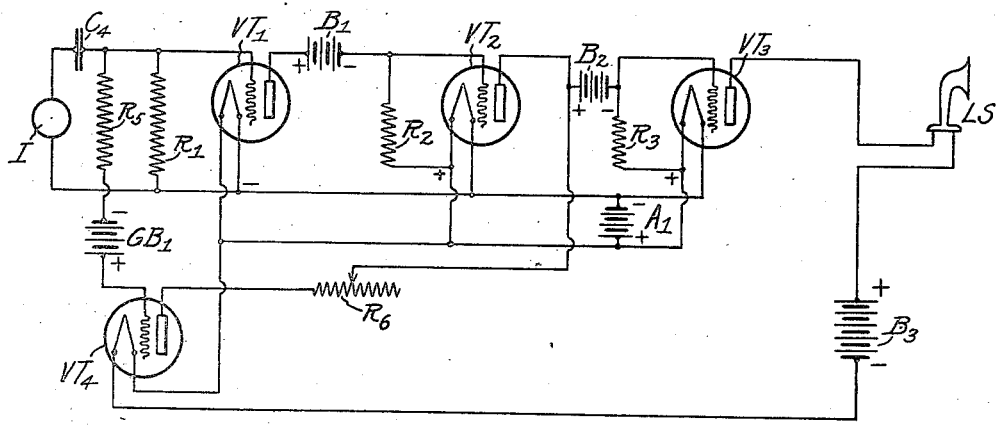

Fig. 9 diagrammatically illustrates a modification of the system of Fig. 8.

Figure 10:
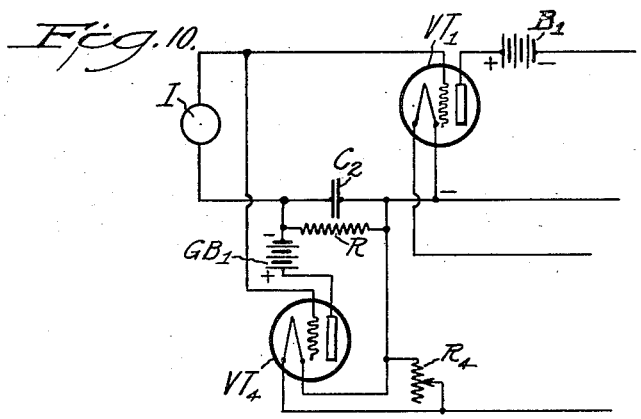

Fig. 10 diagrammatically illustrates a modification of the stabilizing arrangements of Figs. 8 and 9.

Figure 11:
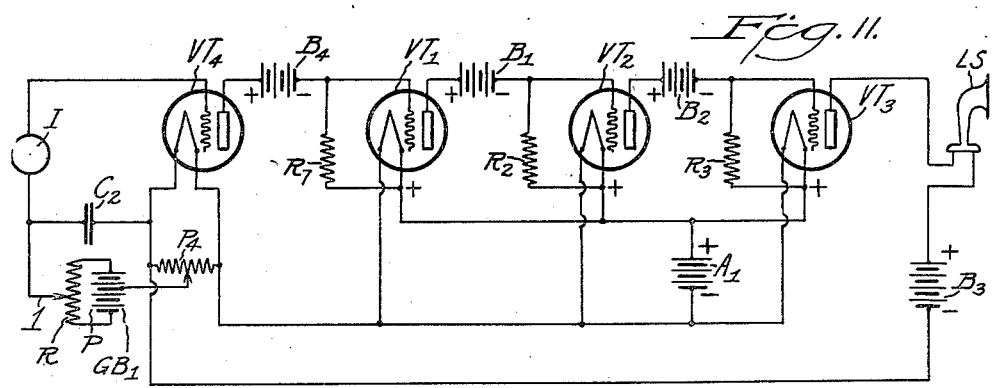

Fig. 11 diagrammatically illustrates the use of the stabilizing arrangement of Fig. 10 in the additional function of a stage of amplification preceding the arrangements of Figs. 7, 8 and 9.

Figure 12:
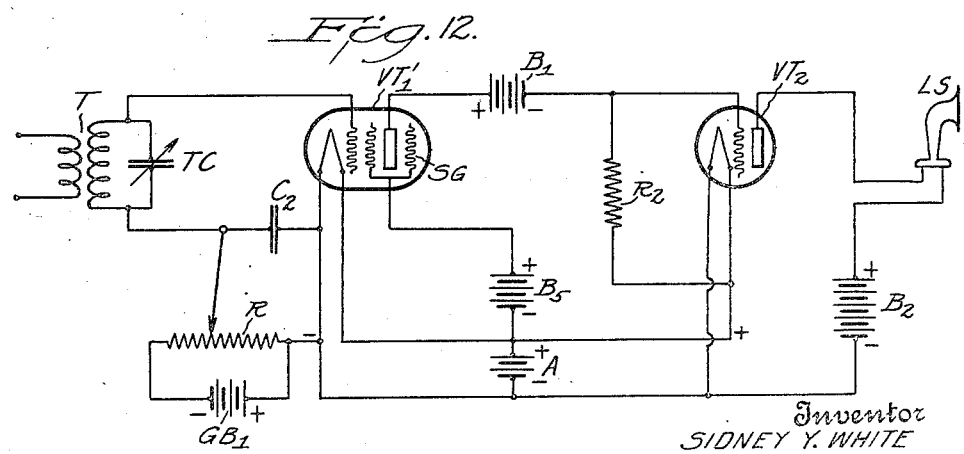

Fig. 12 diagrammatically illustrates a modification of the system of Fig. 3 to employ a four-element tube.

Figure 13:
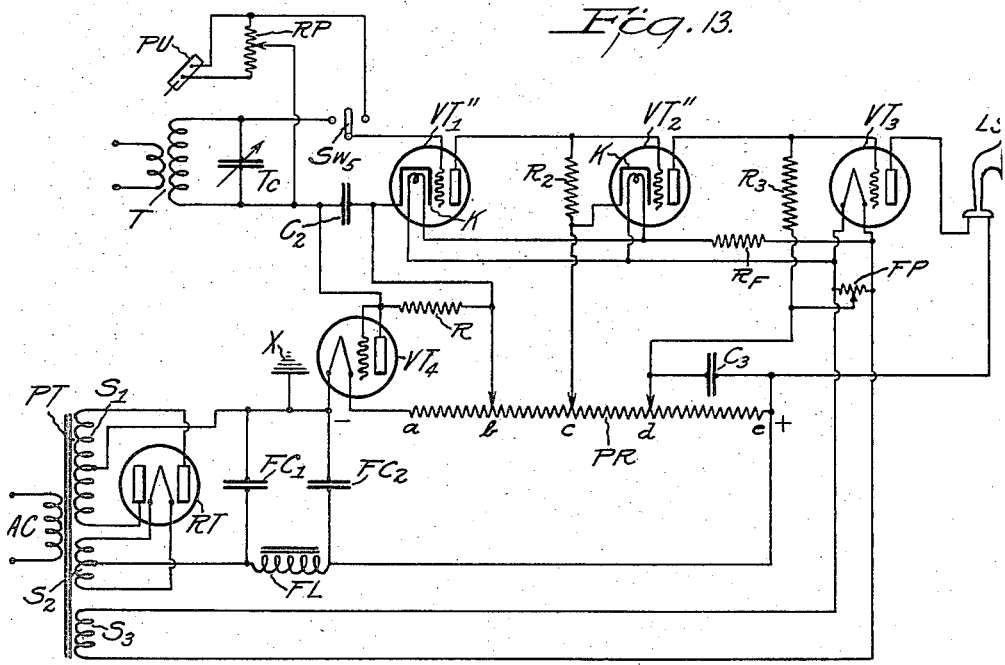

Fig. 13 diagrammatically illustrates the system of Fig. 8 modified to be energized from a source of alternating current, the system being adapted to be employed as a detector-amplifier following a high frequency amplifying system or as an amplifier following a phonograph electrical pick-up device.

Figure 14:
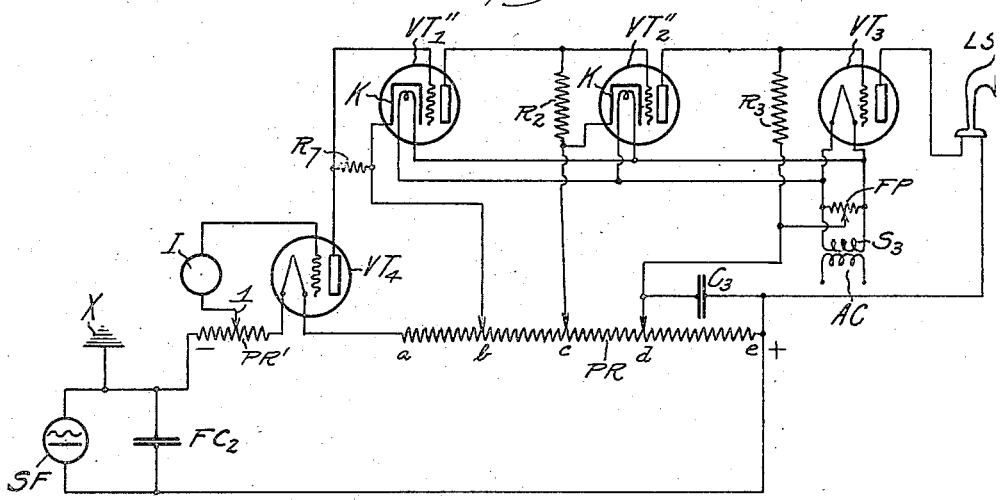

Fig. 14 diagrammatically illustrates a modification of the system of Fig. 13, wherein the stabilizing system is adapted to operate as a stage of amplification preceding the amplifier, a function similar to the modification described with reference to Fig. 11.

Figure 15:
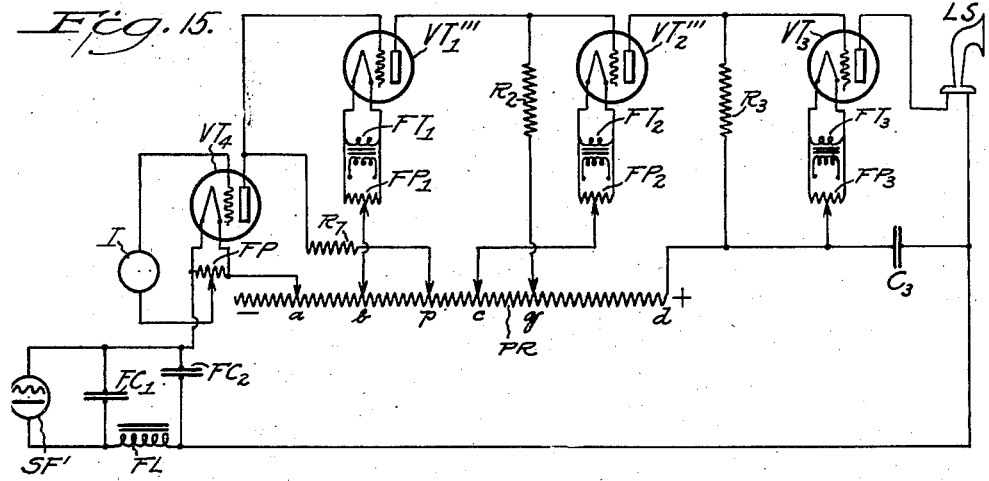

Fig. 15 diagrammatically illustrates changes in the system of Fig. 13 to employ directly heated cathode tubes.

Figure 16:
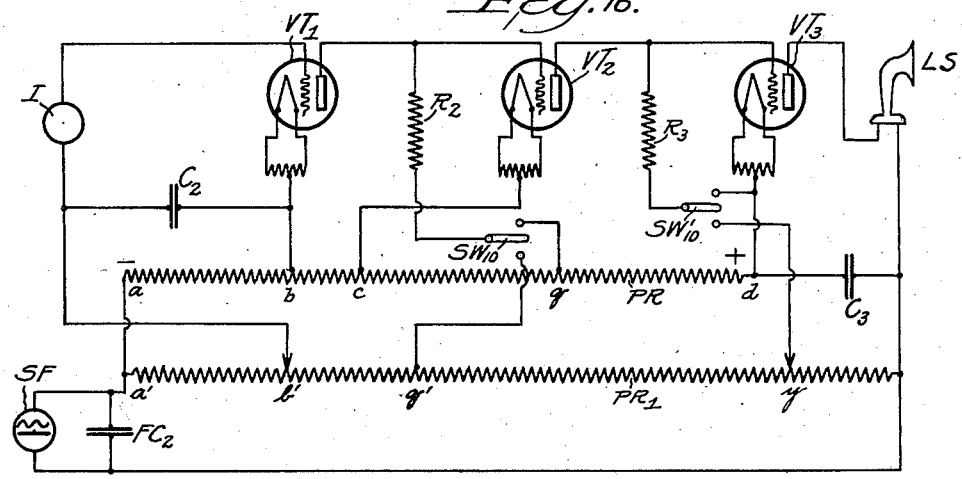

Fig. 16 diagrammatically illustrates a modification of the system of Fig. 13 wherein automatic stabilization is accomplished without the use of a separate tube.

Figure 17:
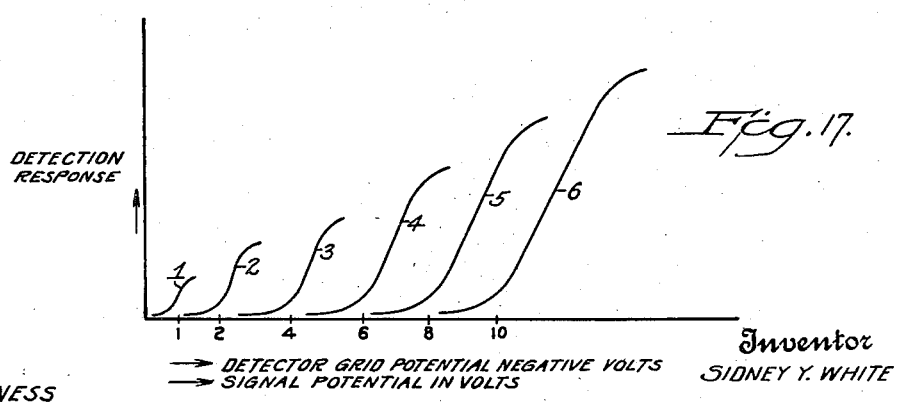

Fig. 17 graphically shows the importance of automatic continuous alteration of the detector grid-bias with variation in intensity of signal current energy as employed in the system of Fig. 16 and other systems herein.

Fig. 18 diagrammatically illustrates the changes necessary to the system of Fig. 17 to employ an even number of tubes.

Fig. 19 diagrammatically illustrates a modification of the system of Fig. 18 to employ an element having a high temperature-resistance change with current change as a stabilizing device.

Fig. 19a diagrammatically illustrates the substitution of the space current path of an electron tube for the resistance element of Fig. 19, and wherein this tube is utilized as a stage of high frequency amplification.

Figure 20:
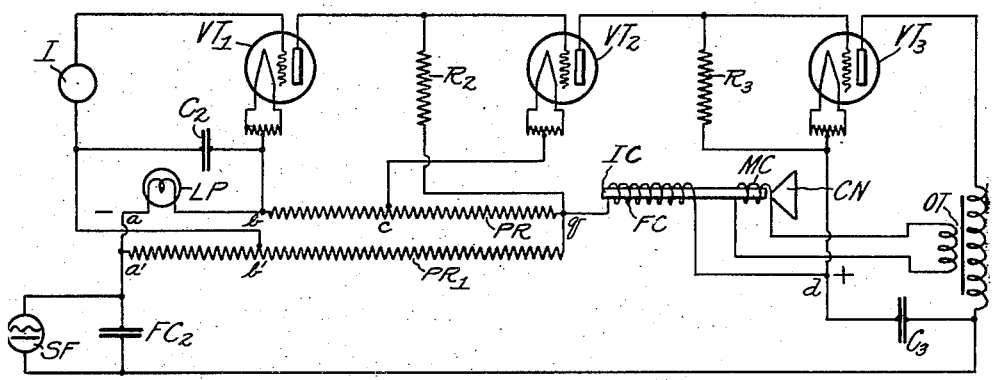

Fig. 20 diagrammatically illustrates a modification of the system of Fig. 19 to employ an odd number of tubes and extending the system to operate an indicator system including an energized field system.

Figure 21:
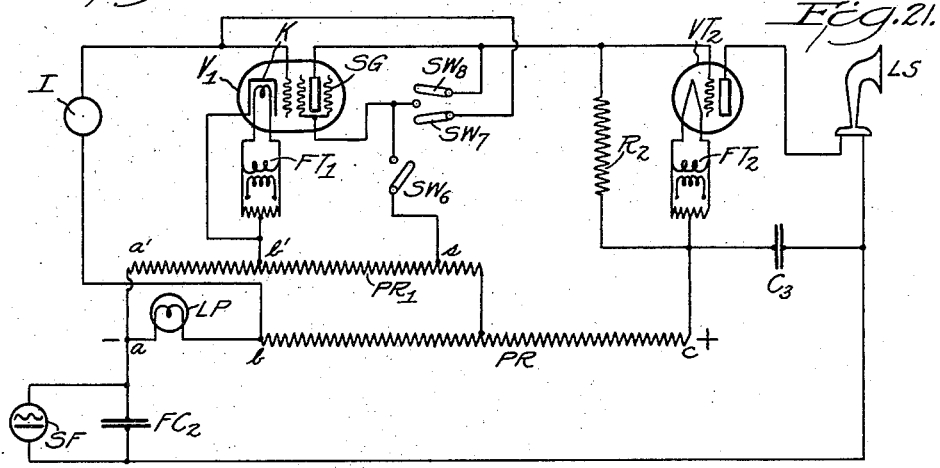

Fig. 21 diagrammatically illustrates the modification of the system of Fig. 19 to employ a four-element tube having a similar function to the four-element tube of Fig. 12.

Figure 22:
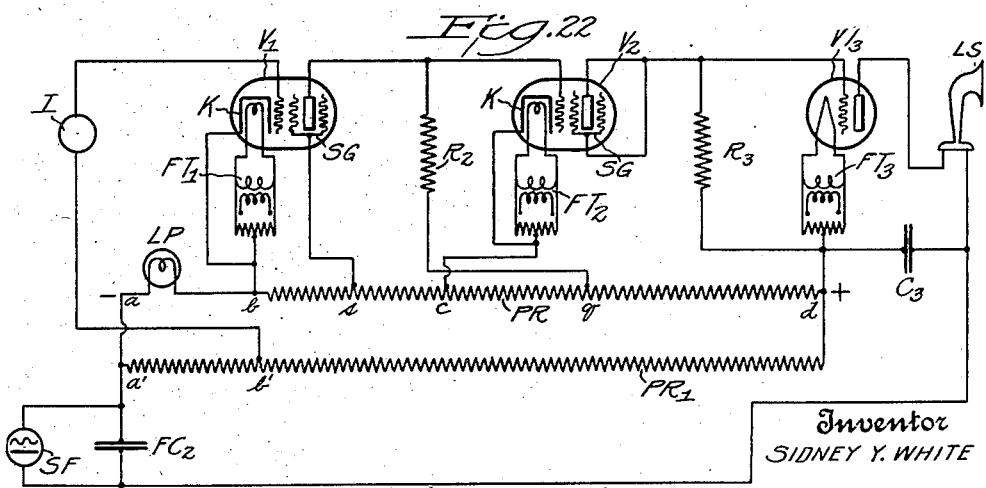

Fig. 22 diagrammatically illustrates the modifications necessary in the system of Fig. 21 to employ an odd number of tubes.

Fig. 23 diagrammatically illustrates a push-pull arrangement of two amplifier systems of the type disclosed in Fig. 22.

Fig. 24 diagrammatically illustrates the manner of using a substantial positive potential on the grid of the output power amplifier of the system of Fig. 22.

Fig. 25 diagrammatically illustrates the energization of the space current path of a preceding tube from the potential difference developed between the grid and plate of the output tube.

Fig. 25a diagrammatically illustrates the energization of the space current paths of tubes preceding the output tube from the grid current of the output tube.

Fig. 26 diagrammatically illustrates a modification of the system of Fig. 25.

Figure 27:
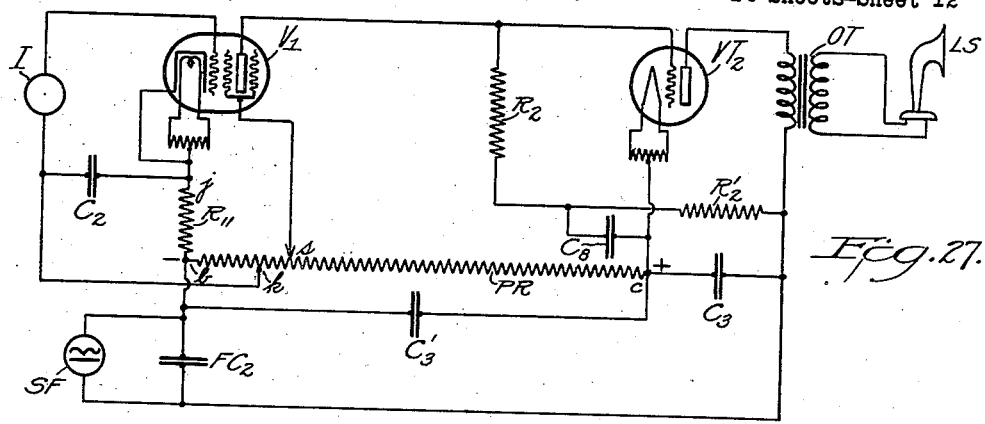

Fig. 27 diagrammatically illustrates another form of self stabilizing system and automatic grid bias control for my improved systems.

Figure 27A:
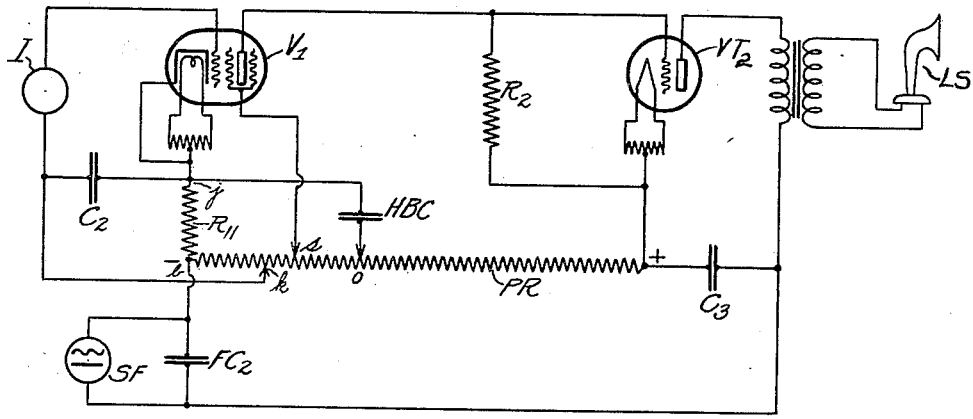

Fig. 27a diagrammatically illustrates a mode of impressing hum components upon the grid-cathode circuit of the input tube of such a phase that hum in the indicating device is obliterated.

Figure 28:
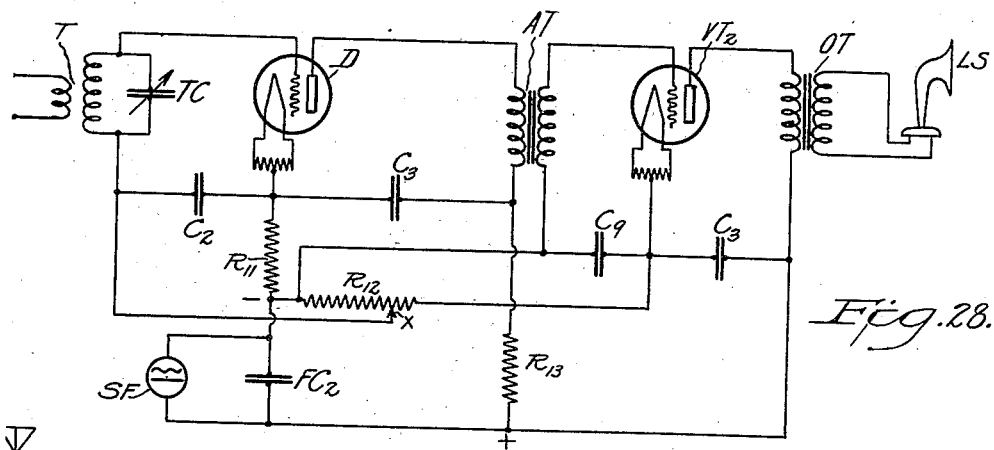

Fig. 28 illustrates an ordinary transformer coupled detector-amplifier system including arrangement for automatically modifying the grid bias of the detector tube with the aid of a potential developed for biasing the grid of a succeeding tube.

Figure 29:
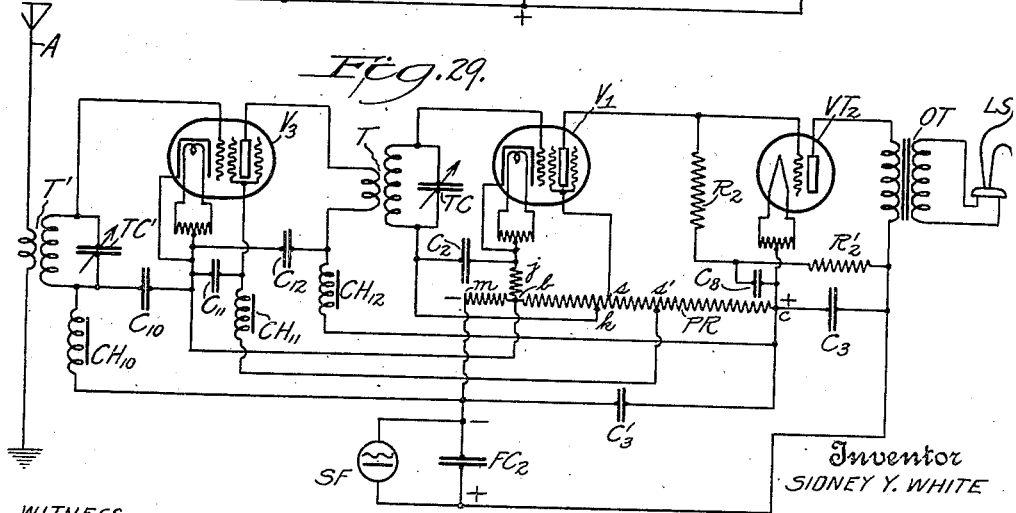

Fig. 29 diagrammatically illustrates the manner of energizing the space discharge paths of a high frequency amplifying system solely from the space discharge current of a low frequency amplifying system.

Fig. 30 diagrammatically illustrates the high frequency amplifying system and detector-amplifying system of Fig. 29 with numerous additional features adapting the system for a high degree of amplification and refinements of operation.

In describing the various figures I give in many instances constants, values and characteristics of elements in order that one skilled in the art may practice my invention without relying solely upon my expressed theories of operation thereof. From the use of selected elements I have found that there are certain laws generally applicable to the systems herein disclosed, but intend no limitations in the scope of my invention by reason of being more or less specific by way of informatory explanation.

Referring to Fig. 1, $VT_1$ and $VT_2$ are three electrode vacuum tubes having their filaments heated from a common battery $A_1$ with positive and negative terminals as shown. In arriving at the graphs of Fig. 2 with the system of Fig. 1 tube $VT_1$ had the high mu of 38.6 requiring 180 volts plate potential for normal operation, and tube $VT_2$ the intermediate mu of 8, the battery $B_2$ providing for positively energizing the plate of $VT_2$ with its normal rating of 90 volts. The grid of $VT_1$ is connected to the negative leg of the filament of $VT_1$ through a potentiometer P comprising a resistance element R, battery $GB_1$ and variable contact arm 1, the battery $GB_1$ being poled negatively towards the grid. The plate of $VT_1$ is connected through a battery $B_1$, positive terminal towards $VT_1$, directly to the grid of $VT_2$ when switch $SW_1$ is closed, and through a very high resistance $R_s$ when $SW_1$ is open. The results had with using various potentials of $B_1$ will be later explained. The negative terminal of $B_1$ can be disconnected from the negative leg of the filament of $VT_2$ by opening switch $SW_2$ or connected to the filament of $VT_2$ through a very high resistance $R_2$ by closing $SW_2$.

In the graphs of Fig. 2 ordinates represent current in microamperes, $I_{P2}$, in the plate circuit of $VT_2$, and abscissæ represent negative potential in volts, $E_{G1}$, impressed on the grid of $VT_1$ with respect to the negative leg of its filament through variation of position of potentiometer arm 1 of the system of Fig. 1 as to graphs 1, 2, 3, 4 and 5, the current being read with the aid of ammeter $A_m$ in the plate circuit of $VT_2$.

Graph 1 of Fig. 2 shows the result had with the potential of $B_1$, or the plate potential $E_{P1}$ of $VT_1$, equal to zero ($B_1$ not connected in circuit) as the potentiometer P changed the negative potential through the range of 0 to −4 volt, switch $Sw_1$ being closed and switch $Sw_2$ being open. Graph 2 shows the result with the potential of $B_1$, or $E_{P1}$, equal to 1.5 volts. For graph 3 $B_1$ had 3.0 volts. For graph 4 $B_1$ had 4.5 volts. For graph 5 $B_1$ had 22 volts.

The significance of the results shown by these graphs of Fig. 2 in the matter of the amplifying ability of the system of Fig. 1 is readily appreciated by examining graph 4 obtained with the insignificant potential of 4.5 volts in $B_1$. This graph shows that in changing the grid potential from 1.7 to 2.0 volts, a change of .3 volt, the plate current varies uniformly from 50 microamperes to 800 micro-amperes, or 750 microamperes.

The remarkableness of the performance of Fig. 1 is better appreciated by comparing these graphs, graph 4 for example, with the normal grid potential-plate current curves of the tubes $VT_1$ and $VT_2$ used in Fig. 1 taken for each tube separately. In Fig. 2 graph 6 is the grid potential-plate current curve of $VT_2$, and graph 7 the same curve for $VT_1$, the tubes having plate potentials of about 100 volts and 180 volts respectively, for normal operation as amplifiers in making these curves. For these two graphs the abscissæ of Fig. 2 represent negative volts on the grid while the ordinates represent the resulting plate current flow in the same tube (usual $E_G$—$I_P$ curves of three electrode tubes).

It is particularly interesting to note from the like steepness of the rising portions of graphs 1, 2, 3, 4 and 5 of Fig. 2 that the amplifying ability of the system of Fig. 1 is substantially independent of the potential on the plate of $VT_1$, being almost as high with zero volts as with 22 volts. The real advantage of increasing the potential on the plate of $VT_1$ is to increase the range of control of the plate current of $VT_2$, though substantially complete range is had with but 4.5 volts, the difference between 4.5 volts and 22 volts being substantially negligible. Clearly the filament-to-plate impedance of $VT_1$ is enormous with a plate potential of but 4.5 volts drawing a plate current of the order of but a few microamperes.

To investigate the filament-to-grid impedance of $VT_2$, switch $SW_1$ is open, thus bringing resistance $R_s$ in series with the filament-to-grid impedance of $VT_2$. I have found that with the resistance of $R_s$ as high as 10 megohms, the graphs of Fig. 2 plot substantially the same as shown for the condition of $SW_1$ closed, thus indicating that the filament-to-grid impedance of $VT_2$ is greatly in excess of 10 megohms.

With the switch $SW_2$ open, there appeared to be a slight tendency towards instability of the system of Fig. 1 at potentials of $B_1$ above 4.5 volts. Upon closure of $SW_2$ to introduce resistance $R_2$ across the grid and filament electrodes of $VT_2$, it is found that this slight tendency towards instability is eliminated with the use of even very high values of resistance $R_2$. The effect of the use of a resistance $R_2$ on the graphs of Fig. 2 is to cause a shift of the lower horizontal branches of the graphs towards higher values of plate current of $VT_2$, somewhat as shown by the dotted line Z commencing at the point Y on curve 2. The higher the value of $R_2$, the lower the point Y occurs on the graph. I have investigated the system of Fig. 1 with values of $R_2$ ranging from 50 megohms down to below one megohm. The value of 50 megohms satisfactorily cures the slight tendency towards instability and, at the same time, preserves practically the entire length of the steep portions of the graphs of Fig. 2, so that for maximum range of operation a resistance for $R_2$ of the order of 50 megohms is preferable. However, as previously pointed out, commercial resistances of such high values have a tendency of first increasing resistance and then opening up with age and use, this being generally true for commercial resistances down to one megohm. My investigations show however, that the point Y shown in Fig. 2 is not materially raised when employing values of $R_2$ in the neighborhood of one megohm and less, and since commercial resistances of these values merely increase their resistance a maximum of about 50% with age and use without opening up, I recommend as a practical matter the employment of resistances at $R_2$ not exceeding one megohm in value until improved manufacture permits the use of the more desirable higher values. In the descriptions of the additional figures to follow it will be understood, unless stated to the contrary, that $R_2$ has a value of one megohm.

From the foregoing, it is apparent that with the grid potential of tube $VT_1$ selected to set the plate current of tube $VT_2$ at about the midpoint of any one of the graphs of Fig. 2, that any variation of potential impressed upon the grid circuit of $VT_1$ will result in a highly amplified reproduction of these variations of impressed potential, and it makes no difference whether these impressed potential variations are derived from direct current effects or alternating current effects. For example the variations on the grid of $VT_1$ may be the currents of high frequency signals, medium or high frequency modulated carriers or audio frequencies, and be amplifiedly or amplifiedly and rectifiedly reproduced by a suitable translating device substituted for the ammeter $Am$ in the output circuit of $VT_2$.

Examination of the system of Fig. 1 shows that it includes no reactive devices other than the distributed capacity of the elements and wires necessary for making up the system. Since the three-electrode tubes are aperiodic devices and the resistances are aperiodic elements, the system as a whole may be termed for all practical effects "aperiodic", or may be said to operate with unity power factor.

Examination of Figs. 1 and 2 also makes it clear that the system must be treated as a self-contained unit, rather than as a plurality of units or stages as is the case in the usual form of amplifier. The graphs of Fig. 2 clearly show that the plate current flow of $VT_2$ is eminently dependent upon the grid potential of $VT_1$. Also, that a change of potential elsewhere, such as the potential of $B_1$, must be taken care of. For example, with the potential of $B_1$ equal to 22 volts, the potential on the grid of $VT_1$ must be set at about minus 3 volts in order to arrive at the midpoint of the plate current curve of $VT_2$, while for a potential of $B_1$ equal to 4.5 volts, the grid potential of $VT_1$ to arrive at the midpoint of the plate current curve of $VT_2$ is about minus 1.87 volts. Obviously like effects will be had by substitution of tubes and other elements having differing characteristics. Thus, for best amplification the mid-point of the vertical portions of the graphs of Fig. 2 must be taken as a reference point for the design of the whole system, constants and potentials of the system being selected accordingly. Since the vertical portions of the graphs of Fig. 2 are decidedly steep, it is obvious that the system is not a haphazard one, but one requiring an intimate knowledge of local and over-all effects.

The importance of these matters will become more apparent as the system is further developed for automatic control and for energizing the thermionic devices from alternating current sources.

Fig. 1 clearly points out its wholly inexpensive character. There is a total absence of iron and expensive windings thereon, the resistances used in lieu thereof being of the very cheapest character. There are no tuned or approximately tuned circuits to interact with one another, thus eliminating the cost of spacing inter-acting elements. The batteries, or other sources of energizing, are called upon for absurdly small current drain, and the particular advantage of this will later be apparent in the descriptions of the systems involving energizing from alternating current sources. The absence of iron and windings eliminates entirely the matter of inductive pick-ups from nearby electrical disturbances, leaving only the very small electrostatic pick-ups of the connecting wires and elements. The cheapness and ease of shielding against electrostatic pick-ups as compared to electromagnetic pick-ups are well known, and operate in a major way to the advantage of the direct-coupled form of amplifier of Fig. 1, a feature which will be further discussed with emphasis in connection with systems having the thermionic devices energized from alternating current sources.

Fig. 3 is the equivalent of Fig. 1 when switches $Sw_1$ and $Sw_2$ are closed with the exception that I have shown a signal or like input system by way of a transformer T for example, which input arrangement may be designed for any order of high or low frequencies. When the signal input is high frequency, such as radio, a tuning condenser TC shown in dotted lines may be usefully employed, and I also prefer to use a signal current by-pass condenser $C_1$ shown in dotted lines of suitable low impedance directly connecting the input to the filament of $VT_1$ to have the signal currents avoid the potentiometer P. Another exception is the battery $GB_2$ in series with resistance $R_2$, which may be dispensed with in favor of a direct connection of $R_2$ to the positive side of the filament system by means of a connection 25 through a switch $SW_3$. Ammeter $Am$ in the plate circuit of $VT_2$ may be replaced by a sound translating device if desired.

In one embodiment of the system of Fig. 3, I used as $VT_1$ a commercial tube known as type 340 having a rated mu of 30 at 180 volts plate potential, as $VT_2$ a commercial tube known as type 371 having a rated mu of 3½ at 180 volts plate potential and requiring about 45 negative volts grid bias for operation as an amplifier. Because of the high grid bias required by $VT_2$ battery $B_1$ was given a potential of 67 volts, and battery $B_2$ the 180 volts normal plate potential for $VT_2$. Battery $GB_2$ was arranged to vary from 22 volts downward.

The system of Fig. 3 operates most effectively either as an audio or other low frequency amplifier, or as a detector and amplifier of radio or like carrier currents modulated at audio frequency when the potential on the grid of $VT_1$ is adjusted by potentiometer P. The detector action was found to be most efficient with the negative potential on the grid of $VT_1$ reduced to substantially that due to the connection to the negative leg of the filament.

While I have found a value for $R_2$ of about 25 megohms was preferable, as stated in connection with Fig. 1, I found that reducing $R_2$ to the commercially safe value of 1 megohm did not materially alter the results. Some slight advantage is had by connecting the battery $GB_2$ positively to the grid of $VT_2$, but I found that practically all of the advantage gained was had by connecting to the positive side of the filament system in lieu of using $GB_2$ as shown by the connection 25.

When modulated or unmodulated radio carrier currents are impressed upon the grid of $VT_1$ there results a decided permanent decrease in the plate current of $VT_2$, this being accompanied by an increase in the plate current of $VT_1$. These effects increase in proportion to the strength of the carrier, so that for a given grid potential of $VT_1$ to initially set the plate current of $VT_2$ at the mid-point of the plate current characteristic curve, it does not require a very strong broadcast signal for example to drive the plate current of $VT_2$ to the lower bend of its curve with resulting tonal distortion. The difficulty is easily overcome by negatively increasing the potential of the grid of $VT_1$ the desired amount to restore the plate current of $VT_2$ to the mid-point of its curve by means of potentiometer P, but it is an important feature of my invention that I provide automatic means for making the correction to be later described.

Whether or not the rectification that is responsible for detection takes place entirely in one part of the system or is a progressive function throughout the system is not clear; nor have I any theory to offer as to why an adjustment that will most effectively amplify audio frequency currents without rectification will most effectively detect and amplify modulated carrier currents. Investigation shows that when the system is detecting carrier currents the high frequency components exist and can be detected in the output circuit of $VT_2$ as well as $VT_1$, showing that there is not an abrupt shift over in any part of the system from modulated carrier currents to audio frequency currents corresponding to the modulations.

Fig. 4 is a system like that of Fig. 1 or Fig. 3, except that instead of connecting the plate circuit of $VT_2$ directly to the filament system it includes a resistance $R_g$ in common with the grid circuit of $VT_1$, so that any current changes in the plate circuit of $VT_2$ are impressed upon the grid of $VT_1$. With a single three electrode tube a resistance common to the grid and plate circuits results in a deregenerative feed back, reducing or destroying the amplifying ability of such a system. In my system the phases of the actions in two adjacent tubes are diametrically opposed, so that with the 2-tube combination shown in Fig. 4 a resistance common to the plate circuit of the output tube and the grid circuit of the input tube results in a regenerative feed-back readily controlled in degree through selection of resistance of $R_g$, and the connection provides for some extremely interesting and useful results.

First of all, because of the aperiodic character of my system there is no tendency to the arrangement of Fig. 4 to break into oscillation at some definite frequency, as do reactive amplifiers, as the feed-back is increased, with the result that the amplifying ability of my system can be progressively increased to enormous proportions uniformly for the different frequencies of a wide range of frequencies. With this arrangement the system is not so critical to the use of high mu tubes for large amplification as is the case of the non-regenerative systems of Figs. 1 and 3. With the regenerative connection of Fig. 4 any tubes that will amplify at all will build the overall system up to very large amplification.

In one example of the action of the system of Fig. 4 the results are shown in the graphs of Fig. 5a in which ordinates represent plate current, in microamperes, $I_{P2}$, indicated by ammeter $Am$, and abscissæ represent negative grid volts, $E_{G1}$, impressed upon $VT_1$ as to graphs 2, 3, and 4. In this case commercial three-electrode tubes known as Type 301-A were used in both positions $VT_1$ and $VT_2$, these tubes having a mu of 8 and normally operating as amplifiers with 90 volts plate potential. $B_2$ had a potential of 20 volts, $B_1$ a potential of 4 volts, $R_2$ a value of 7.5 megohms, and $R_G$ was variable from 0 to 1100 ohms. Graph 2 shows the $E_{G1}$—$I_{P2}$ relation with $R_G$ equal to 0, that is no feed-back in operation. Graph 3 shows the same relation when $R_G$ has 900 ohms with which to cause feed-back. Graph 4 shows the same relation when $R_G$ has 1100 ohms. These graphs were plotted as the potential on the grid of $VT_1$ was progressively changed by swinging arm $f$ along resistance $R$ of potentiometer $P$.

By comparing graph 2, the no feed-back condition, with graphs 3 and 4 involving feed-back, it is seen that the amplifying ability of the system is enormously increased, the straight portion of graph 4 being almost vertical.

A slight increase of $R_G$ over that responsible for graph 4 results in a sort of trigger action upon increasing the negative potential of the grid of $VT_1$ to the critical rise of the curve of the graph. This trigger action constitutes suddenly causing the plate current of $VT_2$ to increase from a very small value to full value, and being maintained in this condition until something is done to interrupt it, such as reducing the negative potential on the grid of $VT_1$ a definite amount. This maintenance of the continuous flow of plate current in $VT_2$ is due to the current being large enough to develop across feed-back resistance $R_G$ a potential applied to the grid of $VT_1$ more than sufficiently large to produce maximum effect on the plate current of $VT_2$.

This trigger effect may be used for example as a trip relay, the potential of the grid of $VT_1$ being so adjusted at a point less than the critical potential that any desired actuating impulse of assisting polarity of direct current or alternating current introduced into the grid circuit of $VT_1$ will supply the additional potential for bringing about the trigger action. The large and continuous flow of current in the plate circuit of $VT_2$ can then be used for actuating, and maintaining actuated, any form of relay device. The system can be reset for further operation in numerous simple ways, such as interrupting plate circuit of $VT_2$, the grid circuit of $VT_1$, or reducing the grid potential of $VT_1$, which operations could well be carried out by the functioning of the device operated by the relay action.

If the adjustment of the arrangement of Fig. 4 is such as to not make a graph too steep, and thus avoid the trigger action, the system is useable as an amplifier of very high amplifying ability, the current effects to be amplified being introduced by some suitable input apparatus into the grid circuit of $VT_1$ as indicated at $I$ of Fig. 4.

In order to further appreciate the efficiency of the system of Fig. 4, graph 1 is included in Fig. 5a. This graph shows the grid potential-plate current relation (the usual $E_G$—$I_P$ curve of a three-electrode tube) of one of the type 301-A tubes used in Fig. 4 in plotting the graphs of Fig. 5a. Graph 1 is drawn to the same scale as graphs 2, 3 and 4, and the relative steepnesses of graphs 3 and 4 to graph 1 pictorially impresses the great efficiency of the feed-back system of Fig. 4.

The progressive steepening of the graphs of Fig. 5a to the point of the trigger action brings out the freedom of the system from the tendency to pass into the oscillating state at high amplifications of ordinary reactive amplifier systems. In fact the system of Fig. 4 never enters the oscillating state, even after reaching the point of trigger action, and is therefore the exception that proves the rule or axiom to the effect that that which will amplify will oscillate.

The graphs of Fig. 5b show the results had with the system of Fig. 4 when commercial tubes known as Type 340 having a mu of about 30 were employed in both positions $VT_1$ and $VT_2$. Graph 1 is the usual grid potential-plate current curve of a single one of the 340 type tubes. Graph 2 is the result with resistance $R_G$ equal to 0, or no feed-back. Graph 3 resulted from feed-back had with $R_G$ equal to 300 ohms. Graph 5 resulted from $R_G$ equal to 320 ohms. Graph 4, the steepest, resulted from $R_G$ equal to 360 ohms. With $R_G$ equal to 1000 ohms, the system snapped into the trigger action somewhat as indicated by the vertical dotted graph 6, and remained in this state until the grid potential $VT_1$ was reduced sufficiently to bring about a reset or return to normal somewhat as indicated by the dotted line 7 showing quite a hang-over between the triggering point and the recovery point. Reducing the feed-back resistance $R_G$ lessened the difference between the triggering point and recovery point.

For an examination of the sensitiveness of the arrangement of Fig. 4 just above described as an electrical trigger, the arrangement was set to be stable just below the trigger point, and so adjusted that the starting in operation of a miniature buzzer removed a distance of ten feet caused the device to trip as above described.

The ordinate and abscissæ relations of Fig. 5b are the same as those specified for Fig. 5a.

Fig. 6 embodies some modifications over the feed-back system of Fig. 4. One modification is the elimination of the grid-biasing potentiometer arrangement in the grid circuit of $VT_1$. The connection of the grid of $VT_1$ to the negative side of the filament system gives some negative potential thereon, and this is supplemented by the flow of plate current of $VT_2$ through resistance $R_G$ to provide an additional or supplementing negative potential. The average value plate current of $VT_2$ and the value of $R_G$ may be so chosen as to produce alone, or with the connection to the negative side of the filament system, the required amount of negative potential on the grid of $VT_1$, thereby eliminating the independent source of potential in the grid circuit.

Fig. 6 is also provided with a tunable input circuit through transformer $T$ and tuning condenser $T_C$. Modulated carrier currents may be selectively introduced into the system, and are detected and regeneratively amplified most effectively, thus making the system a radio receiver. The signal intensity increased greatly by increasing the value of $R_G$, showing that the feed-back is effective for modulated carrier current energy also.

The insertion of a .006 microfarad condenser at $C_2$ makes no perceptible change in the signal intensity, showing that the feed-back action is not a radio frequency one. Such a condenser offers very low impedance to radio frequency current, and if the feed-back depended upon the high frequency component of the energy the low impedance of $C_2$ would materially lessen the feed-back coupling and make a most noticeable change in the signal intensity.

A most interesting and useful effect is the conjoint action of the feed-back effect and the non-uniform with frequency reaction of a usual translating device LS; telephones, electromagnetic loud speaker, or coupling transformer for a translating device for example. The reaction of such devices usually decreases materially with decrease of frequency towards the lower end of the audible range and, if resonant within the audible range, will also decrease in reaction with increase of frequency beyond the resonant point towards the upper end of the audible range. For well known reasons in connection with relating internal and external impedances of electrical devices there results rather noticeable non-uniform sound reproduction effects in the translating device associated with the output tube of the usual amplifier system. My system corrects for these non-uniform reaction effects in effective degree, the result being most noticeable to the ear in examining the tonal quality, for example, of broadcast music.

I account for the improvement as follows: examination of the entire output circuit of $VT_2$ shows that the external impedance thereof is distributed over the impedance of the translating device LS and the feed-back resistance $R_G$, or in other words the output alternating or fluctuating signal potential is divided between the two elements in proportion to the ratio of the impedance of one to the other. This makes clear that when the impedance of LS is high for some one frequency it develops a large potential to be highly effective in sound reproduction, but does so by robbing $R_G$ of potential, thus reducing the amount of feed-back amplification at a time when it is not so much needed. On the other hand, when the frequency is such that the impedance of LS is low and, of itself, it is ineffective in sound reproduction, the excess potential is given to $R_G$ to increase feed-back amplification at a time when more is needed. The result is an automatic straightening out with frequency of the reproduction characteristic in spite of a non-uniform characteristic of an associated translating device, so that the usual undesirable loss of low and high tones of the sound range is nicely corrected.

In the usual amplifier systems for sound currents feed-back effects are most troublesome because they are more pronounced at resonant frequencies of the associated elements, thus supplementing the emphasis had at resonant frequencies with emphasis of regenerative amplification. The disadvantages of over-emphasis in amplifier systems are well-known and cures have long been sought; however, I know of no suggestion having heretofore been made for effecting a cure by deliberately including regeneration as I do in my system of Fig. 6. The system may be defined as one providing for frequency determined reactive modification of a periodic regeneration.

The systems of Figs. 1, 3, 4 and 6, not having the later described automatic connective means for the biasing effect of impressed high frequency current, are suitable for effective so-called continuous or unmodulated signal wave reception without the use of the heterodyne or like chopper method of continuous wave reception practice, and particularly so in connection with such devices as tape recorders and printing recorders. For example, if the continuous wave signals arrive in groups representative of the dot and dash code elements of the Morse system of telegraphing, each group of high frequency waves will produce the bias effect in the system to cause the plate current of the output tube to change and remain changed throughout the duration of each dot or dash of the code. This change and maintenance of change of plate current can be used to operate a direct current relay controlling the inking arm usual to tape recorders. Or if the recorder is of the printing type using so-called Baudot code or like time-spaced signal groups for operating the selector system of the printer, the plate current changes referred to are ideally adapted to operate the relays usual to such selector systems.

While I have referred particularly to the reception of continuous waves because of the usual necessity of employing such a method as the heterodyne in their reception, it is of course a matter of indifference in the use of my system whether the high frequency currents are continuous (CW), interrupted continuous (ICW), or modulated.

In the three-tube system of Fig. 7, tubes $VT_1$ and $VT_2$ are preferably of the high mu type previously mentioned and $VT_3$ preferably of the low or intermediate mu type so-called power amplifier, having its plate energized as for normal operation from a suitable high potential source $B_3$. I find it preferable to choose the value of the potential of source $B_2$ at about one and a half to two times that of the grid bias potential required for normal operation of the power amplifier tube $VT_3$, this in order to assure having adequate range of potential available for swinging the grid potential of $VT_3$ through the entire range necessary to make available the full length of the straight portion of the plate current characteristic curve of $VT_3$.

Source of potential $B_1$ may be very low, such as from 4.5 to 10 volts. Both resistances $R_2$ and $R_3$ are for the practical reasons previously set forth about 1 megohm with a preference for higher values for more efficient operation, and are preferably connected to the positive legs of the filament system as shown, the filaments being energized from a common source $A_1$ poled as indicated. The element I indicates a suitable input system as shown more in detail in Fig. 3.

The system of Fig. 7 includes one of my arrangements for automatically connecting the biasing effect of a high frequency signal impressed at I previously outlined in connection with Fig. 3. The resistance $R_c$ is connected in a direct current portion of the plate circuit of $VT_3$ and common to the grid circuit of $VT_1$. The steady flow of the energizing plate current of $VT_3$ through $R_c$ produces a steady negative biasing potential on the grid of $VT_1$ which, by selecting the value of $R_c$ for the desired plate current of $VT_3$ and combining with any other potential such as that of the negative leg of the filament as shown, may give without auxiliary apparatus the desired bias on the grid of $VT_1$ to set the plate current of $VT_3$ at the mid-point of the plate current characteristic curve.

As previously pointed out the phases of the actions in any two adjacent tubes are opposed, and therefore are like in odd numbered tubes and in even numbered tubes of systems of any number of tubes. Therefore in the three tube system of Fig. 7 an increase of negative potential on the grid of $VT_1$ decreases current flow in the plate circuit of $VT_3$, and vice versa. If the arrival of an incoming carrier current tends to decrease by rectification action the negative potential of the grid of $VT_1$ there results a tendency of the plate current of $VT_3$ to rise and increase the negative potential developed across $R_c$ thereby off-setting the effect of the incoming carrier, the cause and corrective effects being sufficiently closely proportioned to be satisfactorily effective for limited practical requirements. In this way correction is automatic, so that for limited variation of strength of the incoming signal the power amplifier VT₃ always responds from an approximate mid-point of its plate current characteristic curve.

Obviously if the signal currents were also permitted to flow through resistance R_c there would result strong signal degeneration in the three tube system of Fig. 7 in lieu of the regeneration outlined in connection with the two tube systems of Figs. 4 and 6. To prevent signal degeneration I include a signal current choke coil CH in the direct current portion of the plate circuit to prevent signal current from passing through resistance R_c, and provide a signal current path through loud speaker or other translating device LS aided by a low impedance condenser C₃.

The automatic corrective arrangement of Fig. 7 is not my preferred form when wide variation of signal strength is to be handled and when preservation of tonal quality is important because the use of condenser C₃ and coil CH introduces elements having frequency discriminative characteristics. Other forms of automatic corrective arrangements less subject to frequency discriminations and more capable of handling wide variations of signal strength are later described.

The addition of another high mu tube to arrive at the three tube system of Fig. 7 increases the amplifying ability of the system greatly, and yet adds very little to the cost of the system as inspection shows. A cheap resistance R₂, a simple low potential, low capacity battery B₁, and a tube socket for VT₁ are substantially all the elements required.

The system of Fig. 8 differs in detail from that of Fig. 7 only in the matter of form of automatic corrective arrangement, and in the minor detail of mode of correction of loud speaker LS to the output circuit of VT₃, in this case the connection being made through a transformer T₁ as an alternative over the loud speaker connection in Fig. 7.

The corrective arrangement of Fig. 8 is shown to include a filamentary vacuum tube VT₄ connected so the plate current of VT₃ flows through the filament. The grid and plate of VT₄ are shown connected together to form in effect a two-electrode tube having a grid biasing battery GB₁ and a resistance R connected in series with the plate circuit, the battery GB₁ being poled as shown. The grid of tube VT₁ is connected by way of the input system I to the negative pole of GB₁. A signal current by-pass condenser C₂ shunts the resistance R.

The automatic corrective operation is as follows: the arrival of a high frequency signal current into the grid circuit of VT₁ introduces the biasing effect previously described tending to increase plate current of VT₃ and therefore the filament current through VT₄, thereby increasing the emission from the filament of VT₄ to increase the conductivity between the filament and plate, thus allowing increase of current flow from battery GB₁ through resistance R. This increase of current flow through resistance R increases the negative potential on the grid of VT₁, thus off-setting the decrease due to the biasing effect of the incoming signal. In other words, the automatic varying of the temperature of the filament of VT₄ causes VT₄ to automatically take up the function of the arm 1 of potentiometer P in Fig. 1.

The time required for the action of the filament of VT₄ is too great for the corrective effect to be responsive to signal currents even of the low frequency of a few cycles per second, so that the arrangement does not introduce signal degeneration and therefore does not require signal current choking and by-passing elements like the choke CH and the condenser C₃ respectively in Fig. 7. However, the temperature response is sufficiently rapid to prevent the plate current of VT₃ from drifting for long away from the mid-point of the plate current characteristic curve, so that the corrective effect of VT₄ gives no noticeable evidence of its functioning to the listener.

For commercial power amplifier tubes VT₃ of different types requiring from 20 to 50 milliamperes normal plate current, I have found a commercial tube known as type 399 to have such filament characteristics as to be suitable for the automatic corrective needs of the arrangement of Fig. 8. The filament of this tube is designed to operate for normal electron emission with current therethrough of 60 milliamperes, and it reaches a temperature where emission just commences at about 20 milliamperes. I have found that the temperature had at about 34 milliamperes is best suited for the corrective functioning, and I include in Fig. 8 arrangements for adjusting the filament of VT₄ to operate from the point of about 34 milliamperes irrespective of the normal operating plate current of VT₃. I show a resistance R₄ in shunt to the filament of VT₄, so that if the plate current of VT₃ exceeds 34 milliamperes, I can shunt from the filament enough of the excess current to have but 34 milliamperes in the filament. I show also a resistance R'₄ in shunt to the filament system of the tubes across which the battery A₁ is connected. I connect a variable contact arm 2 from this resistance across the filament of VT₄, and I may use this arrangement in lieu of shunting resistance R₄ as indicated by the connection through the switch SW₄. R'₄ has a value of the order of one or two thousand ohms. When the arm 2 is adjusted towards the positive side of the filament system current from battery A₁ is added to the plate current of VT₃ in the filament of VT₄, thus allowing for increasing towards the 34 milliamperes when the plate current of VT₃ is normally less than 34 milliamperes. Adjusting the arm 2 towards the negative side of the filament system causes the resistance in shunt to the filament to become so low that the shunting action predominates, thus providing for shunting excess current from the filament in the case of a VT₃ plate current in excess of the desired 34 milliamperes.

The system of Fig. 9 differs from Fig. 8 in a modification of the mode of use of corrective tube VT₄ and also including an arrangement for automatic control of signal volume. In this arrangement I do not connect the grid and plate elements of VT₄ together. Grid bias battery GB₁ is connected in series with resistances R₅ and R₁ in the grid-filament circuit. The tendency of change of plate current of VT₃ changes the electron emission of VT₄ as before, but now it is the change of conductivity between the grid and filament that allows battery GB₁ to change the current flow across resistance R₁ to alter the potential on the grid of VT₁. Condenser C₄ prevents the input system I from short-circuiting against the functioning of resistance R₁. If this condenser is made small in capacity so that it is commensurate with the capacity of the usual grid condenser in the so-called grid detection system in detecting with three electrode tubes, it will cause a biasing effect on the grid of VT₁ opposed to that of the normal biasing effect of my system, and thus lessen the detection efficiency of my system. To avoid this effect I prefer a capacity value of C₄ in excess of 2,000 micromicrofarads.

The only function of resistance R₅ is to lessen the effect of the capacity to ground of potential source GB₁ upon the tuning characteristics of any tunable system associated with the input system I. However, R₅ is preferably less in resistance than R₁ for the reason that the potential of GB₁ is distributed among the impedances of VT₄, R₁ and R₅, and since the potential across R₁ is the effective potential in biasing the grid of VT₁, the major potential should be concentrated across R₁. For example, I have found that when R₁ has a value of 2 megohms, a value for R₅ of ¼ megohm makes a satisfactory relation.

For the control of signal volume in the arrangement of Fig. 9, I connect the filament-to-plate impedance of VT₄ across the output of VT₂ as shown, preferably including a variable resistance R₆ in series with the connections in order to fix the limits of the total impedance of the connections. Any tendency on the part of the plate current of VT₃ to increase abnormally due to strong signals will increase the emission from the filaments of VT₄ to lessen the filament-to-plate impedance of VT₄, thereby short-circuiting in part the output of VT₂ to reduce the effect of the output of VT₂ on VT₃. When the system is handling a strong signal the tendency is to render the grid potential of VT₂ more negative, thereby rendering the filament-to-plate impedance of VT₂ higher, and to the order of several megohms, so that placing several hundred thousand ohms in parallel, as may be done by the volume control connection shown, results in a short-circuiting effect that is most effective in limiting signal volume.

Fig. 10 shows the input end of the system of Fig. 8 in sufficient detail to illustrate a modification of the automatic corrective arrangement. This modification comprises using the grid of VT₄ independently of the plate to take part in the corrective action. The grid of VT₄ is connected directly to the grid lead of VT₁, so that the same biasing effect of the incoming signal that reduces the negative potential of the grid of VT₁ reduces the negative potential of VT₄ to cooperate with the increase of current flow through the filament of VT₄ in reducing the filament-to-plate impedance, thus accelerating the action of battery GB₁ in increasing the negative potential on the grid of VT₁. Further, the tendency of the grid of VT₄ to become less negative with stronger incoming signals reduces the filament-to-grid impedance, and since this impedance is in shunt to the input system I this amounts to a damping effect, thereby tending to limit the volume for strong signals.

In the arrangement of Fig. 11 the control tube VT₄ is given the additional function of taking part in the amplification of the system, constituting an additional stage over the systems of Figs. 8, 9 and 10. In the arrangement the plate current of VT₃ still passes through the filament of VT₄. The grid of VT₁ is connected to the plate of VT₄ through a source of potential B₄ poled as shown, the signal input system I being now included in the grid circuit of VT₄. The grid of VT₄ is negatively biased through the potentiometer P as in previous systems.

When the signal biasing effect tends to reduce the negative grid bias of VT₄ to decrease the filament-to-plate impedance of VT₄, the tendency is to decrease the plate current of VT₃ in the four tube system constituting Fig. 11 instead of increasing as in a three tube system. The decrease of current flow through the filament of VT₄ increases its filament-to-plate impedance, thus off-setting the effect of the signal on the grid of VT₃. The automatic compensation of the arrangement is excellent. In fact for experiment I energized the filament of VT₄ from a battery independent of the plate circuit of VT₃, and found that changing the filament current from 38.0 milliamperes to 38.4 milliamperes, a change of .4 milliampere, changed the plate current of VT₃ through the range of 5 to 60 milliamperes.

The addition of the tube VT₄ as a stage of amplification increases the overall amplifying ability of the system materially. As an example I found by measurement that a change of one millivolt on the grid of VT₄ changed the plate current of VT₃ one milliampere, a very marked amplification.

The connection of the grid of VT₄ to its filament system to a substantially neutral point as shown by potentiometer P₄ is important in amplifying sound currents to avoid signal current feed-back through the coupling between the plate circuit of VT₃ and the grid circuit of VT₄ due to the resistance of the filament of VT₄. With the large amplification of the system the small resistance of the filament constitutes a rather effective feed-back coupling.

I found that by increasing the potential of B₄ to about 9 volts for the type 399 tube at VT₄ I could operate the system with zero bias on the grid of VT₄, thereby dispensing with the potentiometer P or other biasing arrangement in the grid circuit of VT₄.

I have also observed that the system of Fig. 11 has a sort of signal limiting or volume control effect in that the increase of the radio frequency input beyond about ½ volt did not markedly increase the loudness of output.

Obviously the four tube system of Fig. 11 can be reduced to a two tube system or increased to a six tube system and have the automatic corrective action perform in the same way as described for the four tube system.

In Fig. 12 tube VT₁' is a so-called "screened grid" tube commercial type 322 used in a two tube system with power amplifier tube VT₂ type 371 previously mentioned. Resistance R₂ and battery B₁ have values for operation as previously outlined. I apply a positive potential to the extra grid SG of from 22 to 45 volts from a source B₅. I find the amplification of the two tube system of Fig. 12 considerably in excess of that had when employing the high mu tube type 340 previously described at VT₁. Another advantage had with the extra grid tube when using the system for carrier current detection is that the damping effect on the tuned input circuit shown to include tuning condenser TC is much less than that had with usual detector systems, thus making the selectivity greater and also improving efficiency.

So far the description of my systems has given no consideration to features involved when the tubes are energized from alternating current or like unsteady sources of potential. The features of my system offer particular advantages over the usual systems when it comes to the practice of energizing from the usual 60 or other low cycle commercial alternating current sources, and I set forth in detail following the manner of utilizing the advantages.

The system of Fig. 13 provides for complete energization from a commercial alternating current source AC. Tubes VT₁'' and VT₂'' are of commercial type of about 30 mu provided with so-called indirectly heated cathodes K, the cathodes surrounding the indicated heater elements supplied with alternating current from the secondary winding S₃ of power transformer PT. Tube VT₃ is the type 371 power amplifier previously mentioned, the filament of which is also heated by alternating current from secondary winding S₃. Resistances R₂ and R₃ have values as previously specified, R₂ being connected directly to the cathode K of VT₂'', and R₃ being connected to a potentiometer FP across the filament of VT₃.

For energizing the plate electrodes a full-wave rectifier RT has its two anodes energized by a secondary winding S₁ and its filament energized by a secondary winding S₂. This rectifier supplies a filter system including a choke coil FL and filter condensers FC₁ and FC₂. The fluctuating uni-directional current of the filter is passed through a resistance PR, the potential polarity of which is as indicated.

The developed potential of PR between the points d and e, about 180 volts is applied to the plate of VT₃ for normal operation of this tube. Condenser C₃, of about 2 microfarads, acts as a signal current bypass around the section d to e, and also aids in filtering the plate current of VT₃.

The potential developed between the points c and d, about 100 volts, is impressed through the filament-to-plate impedance of VT₂'' upon the grid of VT₃, thus taking the place of battery B₂ in previous figures of direct current systems. The potential developed between the points b and c, about 30 volts, is impressed through VT₁'' upon the grid of VT₂'', thus taking the place of battery B₁ in previous direct current systems.

To utilize automatic correction for detection of carrier currents the current of resistance PR is also passed through the filament of VT₄, which may be type 399 previously mentioned, and since the current through resistance PR includes the plate current of VT₃, the corrective action of VT₄ will be as previously outlined in connection with direct current systems. The potential developed between the points a and b takes the place of battery GB₁ in previous systems for developing a biasing potential across resistance R for application to the grid of VT''₁ for automatic correction.

The one-pole switch SW₅ provides for connecting to the input of VT''₁ either the tunable input system including tuning condenser TC for carrier current reception, or a connection from a phonograph pick-up device PU, the arrangement including a variable resistance RP for regulating the input to the amplifying system from the pick-up. When switch SW₅ connects the pick-up device, the automatic corrective system is still included for, while it is not so much needed for low frequency current amplification in the matter of biasing effect, it is effective in correcting for variations in tubes that may be used, variations in line voltages, and other factors which might throw the system out of adjustment for best operation.

While tubes VT''₁ and VT''₂ are designed to require five volts across the cathode heater elements for normal operation, the same as the filament voltage of VT₃, the very small plate current taken from the tubes in the preceding positions of my system make it unnecessary to produce the usual amount of electron emission, and I have found that the potential across the heater elements of these tubes could be reduced to four volts by a resistance R_F without affecting the efficiency of the system, but advantageously reducing temperature of heater and cathode to prolong the normal life of the tubes. This effect is true irrespective of whether tubes are designed for alternating current operation or direct current operation previously described.

The system of Fig. 13 amplifies low frequency currents and detects and amplifies carrier currents with the same efficiency as the previously described direct current energized systems. The hum in the loud speaker LS due to alternating current energizing is remarkably low, so much so that I was enabled to reduce materially the capacity of filter condensers FC₁ and FC₂ over that originally estimated in view of practice with other forms of amplifiers of equivalent efficiency. In fact, I first prepared for the system with a two-section filter employing two choke coils FL and three filter condensers, but found this degree of filtration unnecessary to arrive at satisfactory low hum. The filter condensers are each two microfarads and the choke coil has an inductance of 50 henries, this compared with the usual two choke coils and 10 to 15 microfarads of condenser usually employed for filtration purposes in ordinary systems.

I account for the effectiveness of hum obliteration by my mode of impressing the energizing currents upon the different parts of the system. Hum disturbances are created in the cathodes of each of the tubes, but the disturbances created in the indirectly heated cathodes of VT''₁ and VT''₂ are much smaller in the tubes themselves than in the directly heated, high voltage filament of VT₃. This small hum of the preceding tubes is amplified to proportions in the neighborhood of that produced in VT₃, so that the hum coming from the preceding stages can neutralize that generated in the last stage. The variable potentiometer FP across the filament of VT₃ permits of regulating the amount of hum in VT₃, and also changing its phase as the contact is moved from one side to the other of the midpoint, so that neutralization can be regulated. In addition, the aperiodic character of the system does not bring in phase displacing of hum currents and harmonic generation is substantially absent, so that hum neutralization is greatly facilitated over transformer and impedance coupled amplifier systems in which phase displacement and harmonic generation abound.

It is also seen that the connections of Fig. 13 for energizing the plate and grid electrodes of the tubes from potentials developed in resistance PR are such that the hum currents arising in one tube or stage oppose those arising in an adjacent tube or stage. In connection with the description of the previous systems energized by direct current, I pointed out that the potentials of batteries B₁ and B₂ are not critical factors. It will be noted that in spacing the connections b, c and d along resistance PR, I have not arrived at differences of potential matching those of batteries B₁ and B₂ in the direct current systems. This is due to the fact that I have chosen differences of potential along PR which have aided in hum obliteration, finding that I could do this without interferring with the operating efficiency of the system. As before stated, the aperiodic character of the system materially aids in carrying out adjustment for hum obliteration from the energizing of plate and grid electrodes.

It is seen that the mode of connection of signal current by-pass condenser $C_3$ in Fig. 13 reduces the amount of signal current that flows in the section of resistance PR included between points $a$ and $d$, thus limiting the degree of signal feed-back conditions because of the presence of signal current in PR that has to be handled. The connections are such however that there is a tendency for signal current feed-backs to neutralize as between adjacent stages. For example, the signal current in sections $c$ to $d$ affecting the input of tube $VT'_3$ is opposed by the signal current in section $b$ to $c$ affecting tube $VT''_2$, and since the potential from $c$ to $d$ is greater than the potential from $b$ to $c$, there is some compensation for the difference in amplification undergone by the two feed-back effects. For the same reasons there is tendency of the system of Fig. 13 to automatically self-stabilize against the biasing effect of an incoming carrier current. A change of plate current in $VT_3$ changes the amount of the direct current component in resistance PR, thus changing the differences of potential in the various potential sections. It is clear that the potential for section $c$ to $d$ affecting the grid of $VT_3$ has its effect opposed by the potential from $b$ to $c$ affecting the grid of $VT''_2$, and that the potential in section $a$ to $b$ has its effect opposed by the potential in the section from $b$ to $c$. However, it is generally better to adjust the relations of the sections in the matter of potentials for efficiency of operation and hum suppression, and to rely upon the aid of a special control device like tube $VT_4$ and other arrangements to be described for automatic correction. At best the automatic correction obtainable through potential resistance PR approximates that of the arrangement of Fig. 7, not enough for usual requirements.

In some assemblies it is found that a connection of the lowest potential part of the system to ground is of some value in the suppression of hum, which connection may be made to the negative side of the filter system for example as shown at X. It is also well in some cases to connect to ground the usual metallic containers of the power transformer PT and the inductance coil FL. Inspection of Fig. 13 shows however, that there are no inductive elements at the input end of the system of such character as to be effective in collecting low frequency disturbing energy, with the result that little difficulty is had in the matter of location of the elements in the input end of the system with respect to the power transformer PT, as is had in the usual systems in finding locations for the audio transformers or impedance coils with respect to the power transformer. In the matter of inductive pick-up of 60 cycle current there is no practical way of shielding one of the elements from the other, it being well known that the 60 cycle inductive effects will penetrate containers of even the best of magnetic irons, so that the only cure is wide separation, sometimes requiring distances of from one to two feet. The input system of my Fig. 13, and like systems to follow, can only pick-up disturbances through electrostatic effects, and shielding for electrostatic effects is simple, any conductive material sufficing. About the only attention that need be given to inductive coupling effects is that between power transformer PT and filter coil FL, and since there is no amplification between these two units, the problem is in nowise serious, close spacial relation being possible if proper orientation of these two elements is used. Care should be taken to avoid having a wire associated with the output of $VT_3$ pass sufficiently close to a wire associated with the grids of $VT''_1$ or $VT''_2$ to provide sufficient electrostatic coupling to effectively transfer the highly amplified energy to the grids of these tubes.

The arrangement of Fig. 14 provides for introducing tube $VT_4$ into the additional function of acting as another stage of amplification for the system of Fig. 13, in much the same way as in the direct current system of Fig. 11. The input system I is shown included in the grid circuit of $VT_4$, the plate of $VT_4$ being connected directly to the grid of $VT''_1$. In this arrangement the potential developed in section $a$ to $b$ of resistance PR takes the place of potential of battery $B_4$ in Fig. 11. An additional potential resistance PR' provides for developing a negative potential for the grid of $VT_4$ if needed though, as in the case of Fig. 11, I have found that by proper choice of potential in section $a$ to $b$, I can operate $VT_4$ satisfactorily without any initial negative potential thereon other than that due to connection to the negative leg of the filament of $VT_4$; in other words, moving the contact arm I all the way to the right.

The details of Fig. 14 other than the connection of $VT_4$ are as in Fig. 13, the details of the power supply, rectifier and filter system being abbreviated by the indicated source of fluctuating uni-directional current SF.

The system of Fig. 15 includes a number of modifications to and improvements over the system of Fig. 14. Tubes $VT'''_1$ and $VT'''_2$ are high mu tubes as before, but instead of having indirectly heated cathodes for alternating current energizing they have filaments specially constructed to adapt them for raw alternating current heating without generating excessive hum disturbances by reason of such energizing. As one example of this form of tube used by me, the filaments are oxide-coated to produce effective electron emission at low temperature, and have short, thick filaments operating for normal emission at about .7 volt and 1.25 amperes, which construction provides for low hum disturbances both because of small temperature variations and small potential variations during an alternating current cycle. Because, as before stated, I do not need to operate tubes in positions of $VT'''_1$ and $VT'''_2$ for the full emission normally required, I found that I could heat these special filament tubes at about .55 volt without loss of efficiency to the system and with less hum disturbance production in the filaments, it being obvious that for the reduced conditions of operation the temperature and potential were both correspondingly reduced to make the hum producing characteristics less effective.

For $VT_3$ I employ in one adaptation of the system of Fig. 15 a power amplifier tube commercially known as type 350 requiring for normal operation 450 volts of plate potential and 80 volts of grid potential, and having a filament requiring about 7 volts, the result being about 50 milliamperes of plate current.

Since the filaments of all of the tubes of Fig.

15 are interconnected through potential resistance PR, it is not possible to energize any two filaments from the same heating circuit as in the case of the indirectly heated cathode tubes of Fig. 14. It is seen that to do so would short circuit by way of the filament heating circuit the various sections of the resistance PR needed for energizing the system. For this reason separate transformers $FT_1$, $FT_2$ and $FT_3$ energize the three filaments from the alternating current source. However, I have found that there is no electrical objection to including the windings for the several transformers on the same core, and it may be the same transformer supplying the rectifier for the development of the plate potentials, or even using one primary winding in the power transformer for supplying all of the secondaries of the system.

The several filament circuits are shown to include potentiometers $FP_1$, $FP_2$ and $FP_3$ for making connection between parts of the system and the filament by way of variable contact. This permits of adjustment to permit of opposing hum arising in one part of the system by hum arising in another part of the system, and this so-called "hum bucking" is most effective in hum obliteration. For example, I find that I can place the potentiometer contacts of $FP_2$ and $FP_3$ to either the right or left extremes to create very strong hum in loud speaker LS, and neutralize the hum due to these extreme positions by adjustment of the contact of potentiometer $FP_1$ of the leading tube, this because the amplification following the leading tube allows for its hum most effectively neutralizing large hum of succeeding tubes. In other words, a commercial design of system could dispense with potentiometers $FP_2$ and $FP_3$ for a simple connection to one or the other leg of each of the filaments, and rely upon the variability of $FP_1$ of the first tube for hum correction.

While the hum difficulties are bettered by operating the filaments of the first two tubes at the less than normal potential of .55 volt without derogatory effect on efficiency, yet this lower potential operation increases the length of time required for the filaments to heat up and bring the apparatus into operation after turning on the current supply, say from 5 seconds to 10 seconds, which delay may be objectionable to some users of systems, for example, broadcast listeners. The difference in hum generation under the two conditions is not sufficiently great that the greater hum cannot be tolerated for the advantage of less delay if the matter of delay is a factor.

It is apparent that the high voltage filament of power tube $VT_3$ tends, of itself, to generate considerable filament hum disturbance, so that the effectiveness of hum elimination in the system is well indicated by the fact that connection can be made to one leg of the high voltage filament of $VT_3$, and yet all of the hum neutralized by a slight movement across the very low voltage element of potentiometer $FP_1$ of the first tube.

Another feature is that the system of Fig. 15 does not include in potential resistance PR the $d$ to $e$ section across the plate circuit of $VT_3$, so that all of the current in PR flows through tube $VT_3$. This means that no more than the total current required for operating the power amplifier of the system is drawn from the supply by way of the filter system, and that there is even no excess beyond that required by the power amplifier for the energizing of the preceding tubes, an arrangement not found in other systems of amplification. The advantage of this is not one of the mere saving of electrical energy, but includes advantages in the matter of perfection of filtration or reduction of filter material to arrive at a given degree of filtration. It is well known that the less the load on a filter system the more perfect the filtration for a given quantity of filter material, this being well demonstrated in the appreciation that the filtration of any filter is substantially perfect under no-load conditions and substantially fails to be a filter under short circuit conditions.

Another way of impressing the advantage is that in Fig. 13 the section $d$ to $e$ of resistance PR is in shunt to the plate circuit of $VT_3$, and thus permits drawing from the filter system a current in excess of that required for a plate circuit of $VT_3$. I pointed out that under these conditions, the filter condensers $FC_1$ and $FC_2$ of Fig. 13 each had a capacity of 2 microfarads and choke coil FL an inductance of 50 henries for satisfactorily low hum. In the arrangement of Fig. 15, I found substantially the same degree of low hum could be obtained with filter condensers $FC_1$ and $FC_2$ as low as ½ microfarad each and the inductance of coil FL as low as 25 henries.

Another feature of difference and advantage of the system of Fig. 15 over the system of Fig. 14 is the mode of connection to the potential points in resistance PR. For example, tube $VT_3$ requires about 450 plate volts for full operation, which is obtained by selecting the value of resistance PR in series with the plate impedance of $VT_3$ to properly distribute the total output potential of the filter system to give $VT_3$ the desired 450 volts. Since tube $VT_3$ requires about 80 volts grid potential, I choose the section $c$ to $d$ of PR to have about 160 volts. Now I may choose to impress through $VT'''_1$ a potential of 100 volts. Instead of obtaining this potential by moving 100 volts negative to point $c$, I connect $R_2$ to a point $q$ positive to a point $c$ and the point $b$ to a potential less than 100 volts negative to the point $c$ by the amount that the point $q$ is positive to the point $c$. This kind of connection therefore reduces the amount of potential that must be had at the output of the filter system to supply all of the potential needed over the form of connections used in Figs. 13 and 14, and I have found that I can make a substantial reduction with advantage and also of assistance in arriving at a general rule to be followed for best hum obliteration in lieu of searching along the resistance PR for best positioning of each new design. The rule I use is that the point $q$ is as many volts positive to point $c$ as the point $b$ is negative to the point $c$. In other words, if $b$ to $q$ represents 100 volts, as it was in one arrangement of Fig. 15, $b$ to $c$ and $c$ to $q$ should each be 50 volts. Now, by properly selecting the filament-to-plate impedance of $VT'''_1$ and resistance $R_2$ each can be made to have a difference of potential of 50 volts thereacross, so that the resulting potential upon the grid of tube $VT'''_2$ is substantially zero, with a preference towards slightly negative, when the system is made ready for operation. I find that adjusting by this rule closely satisfies both efficiency of operation and best hum obliteration.

The connection of points $a$ and $p$ for operation of tube $VT_4$ may also be chosen in accordance with the same principles, though it may be that in order to obtain some special initial grid bias on the first tube, this relation will not be followed in choosing the section $a$ to $b$.

As in the case of Figs. 13 and 14 condenser C₃ is a signal current by-pass of the order of from 1 to 2 microfarads for audio frequency currents, and limits the amount of signal current in resistance PR involved in feed-back effects. Since the residual signal current in PR is subject to the same potential distribution in the various potential sections as is the rippling or fluctuating component of the filtered energizing current, the selection of potential points in PR that favor hum obliteration by bucking from stage to stage also favor feed-back obliteration. Thus the selection of the positive $p$ and $q$ points in Fig. 15 as previously outlined introduces no difficulties in the matter of feed-back effects.

The filament of VT₄ is shown to have a potentiometer FP to which the grid is connected, thus providing for fixing the initial bias of the grid of VT₄, or adjusting for hum neutralization or signal current feed-back as may appear most needed in a particular system. In addition the resistance of FP may be chosen of such value as to shunt the desired amount of current from the filament of VT₄ to have it operate at the required point for best automatic correction. For example, the 50 milliamperes plate current of the type 350 tube which may be used in position VT₃ is more than is needed for the type 399 tube which may be employed in position VT₄.

With the organization of elements to which I have made specific reference as making up a Fig. 15 system, I found by changing the values of resistances R₇, R₂ and R₃ in many steps through the range of .1 megohm to 5 megohms that the smaller these resistances are in value the greater the hum, but that with 1 megohm values the amount of hum is small enough to be in nowise objectionable, thus again bringing in no insistent requirement that the safe commercial construction of 1 megohm be exceeded for the unsafe higher values.

A further observation was made by me when using the type 350 tube. In describing the action of experimental Fig. 1, I pointed out that no resistance R₂ is needed with a low potential of B₁ in that figure, but upon increasing the potential of B₁ a sort of unstable action takes place. The unstable action referred to has the characteristic of making a fuzzy or fringy signal, indicating the inability of the signal current charge on the grid to leak off rapidly enough, as commonly happens in the case of an improper or defective grid-leak connection for a so-called "hard" three electrode tube connected for so-called "grid detection". A number of the commercial type 350 tubes show a trace of gas current, particularly when operated at the rated high voltage, and I found that with such tubes I could disconnect the resistance R₃ in Fig. 15 and the system would still operate normally. In other words, provision must be had for relieving the grid of the tubes of signal current charges, and if it is had by an action within the tube that provides a leakage path, then an external leakage path is not necessary.

I have also found the so-called "secondary" or "grid-emission", resulting in current flow in the grid circuit, which has appeared in some of the tubes of modern construction with resulting difficulties in the usual amplifiers, has no derogatory effect upon the operation of my system, particularly when automatic correction is included. Any potential changes introduced by the direct current flow resulting from grid emission are automatically corrected as are potentials arising from other sources as previously pointed out.

A further observation is that no great difference in hum obliteration results from so-called "single-wave" rectification in lieu of full-wave rectification in supplying the filter system, which is far from true in the usual reactance coupled amplifiers. The aperiodic character of my system accounts for this advantage also, there being no harmonic generation to scatter the 60 cycle current of single-wave rectification over a large number of upper and variously phased harmonics as happens with reactive elements present.

The foregoing observations as to my system, and particularly as to Fig. 15, permit of making clear an operating advantage of it over the so-called resistance coupled amplifier. The resistance coupled amplifier requires the interposition of a condenser between the coupling resistance and the grid of the succeeding tube to isolate the grid from the high potential applied to the plate of the preceding tube. This condenser offers reactance that varies in wide degree for the different frequencies that must be handled by an audio amplifier, thus causing the amplifier to discriminate greatly against the lower of the audible frequencies.

The use of the condenser makes its necessary to employ a leak resistance between the grid and filament of the succeeding tube in order to provide a path for biasing the grid as well as permitting the signal current charges to leak off. If the condenser is made of large value to offer less reaction to low frequencies the leak resistance must be made low in value to permit of sufficiently rapid leaking off of the signal current charges to avoid the fuzzy or fringy effect in signals previously mentioned, but this lowering of the value of the leak resistance reduces efficiency in proportion as the value of the resistance is below the high input impedance of the succeeding tube.

The result in practice is a compromise, so that in order to have any useful efficiency condensers are chosen of such small value that the very much in demand low notes of musical reaches are noticeably lost. Having no reactive element in my system there is no discrimination against any frequencies, and having no charged condensers (other than the very small capacity of the grid) resistance approaching infinite values may be used for efficiency.

Fig. 16 includes an arrangement for obtaining automatic correction without the use of an auxiliary element such as VT₄ in previous figures, but with an improvement in the degree of correction over that of the arrangement of Fig. 7.

In Fig. 16 and succeeding figures, I omit details as to energizing cathodes, the features of energizing indirectly heated cathodes being fully explained in connection with Fig. 13 and heating filament types of tubes being fully explained in connection with Fig. 15, making it unnecessary to repeat these details in connection with figures embodying features not particularly related to the method of energizing the filaments.

In the arrangement of Fig. 16, I include a potential resistance PR₁ in parallel to resistance PR, the resistance of PR₁ being so chosen that its current drain on the filter system is but a small fraction of the total current required by VT₃ which flows through resistance PR. For example, if VT₃ is a 350 type of tube requiring 50 milliamperes plate current, so that the current through PR is 50 milliamperes, the current through PR₁ may be 5 milliamperes, or even less. Now it is apparent that for any potential point between a and d on PR, there can be found a corresponding direct current potential point on PR₁ with zero difference of potential between the two points. For example, if the point d is 200 volts positive to the point a, there may be found on PR₁ a point also 200 volts positive to point a', which is at the same potential as point a, so that any electrical element connected between the two points so chosen will have no difference of direct current potential impressed upon it. However, if the current through PR is changed in value, say 10%, as by a signal being impressed upon input I changing the plate current of VT₃ 5 milliamperes, the difference of potential between points a and d will change 10%, or 20 volts. At the same time there is very little change of current in PR₁ as its current is only slightly affected by the change in load on the filter system by the change in current through VT₃ and PR. Therefore, this change in current in PR results in changing the difference of direct current potential between the two points mentioned substantially 20 volts. Thus the system of Fig. 16 provides for an incoming carrier current usual to practice having an effect capable of producing differences of direct current potential ranging from zero volts to the neighborhood of 20 volts, a feature which may be put to use in a number of ways in connection with radio and like systems.

For general use of a system such as that of Fig. 16, a range of potential change as much as 20 volts is not needed for automatic correction, so that I show the system so connected as to employ a lesser range of potential change. In order to apply a potential change to the grid of VT₁ I connect the filament of VT₁ to the point b, about 20 volts positive to the point a at the negative end of resistance PR. The grid of VT₁ is then connected to some point b' on PR₁ such that there is a desired initial difference of potential giving any desired degree of positive or negative initial bias on the grid of VT₁, or zero bias. That is, if a to b is 20 volts and a' to b' is 20 volts, the initial bias on the grid of VT₁ is zero. If a' to b' is 22 volts, the initial bias of VT₁ is a positive two volts. If a' to b' is 18 volts the initial bias on VT₁ is a negative two volts. Other combinations of any degree desired are apparent.

Since the system of Fig. 16 is made up of an odd number of tubes, a carrier current on the grid of VT₁ will cause the plate current of VT₃ to increase, and therefore increase the current through section a to b, thereby unbalancing the direct current potential relations to change the potential on the grid of VT₁ in a negative sense, tending to offset the action of the incoming carrier current to maintain the current of VT₃ constant. The arrangement performs the desired function of correction most effectively, permitting the signal input to vary through very wide ranges of intensity, and is considerably more effective than the arrangement of Fig. 7.

It is apparent that even though signal by-pass condenser C₃ reduces the amount of signal current in PR, the elimination is not complete so that section a to b includes considerably more signal current than section a' to b', and there is not a balance in what might be termed the bridge system as between signal current components when there is a balance as between direct current components. This results in signal current degeneration in proportion to the reactance of condenser C₃ to different frequencies, the degeneration being more intense the lower the frequency, so that in handling music and other sounds the system discriminates against the lower frequencies to some extent, but the effect is no particular disadvantage in connection with telegraphic and other forms of signaling not particularly concerned with tonal quality.

I have found that I can reduce the undesired degeneration effect for sound signals by connecting the resistance R₂ to a selected point q' on PR₁ instead of to the usual point q on PR in some suitable manner for shifting the connections as switch SW₁₀, and other arrangements for curing the difficulty are later set forth.

Through a switch SW'₁₀ resistance R₃ can be connected either to the cathode of VT₃ or to a point y on PR₁ more positive than the cathode for like reasons to those pointed out for R₂ in Fig. 15, the absence of extension of resistance PR in Fig. 15 to the plate circuit preventing using the positive connection for R₃ in that figure.

This feature of automatically modifying the grid potential of a detecting tube or system with change of strength of incoming signal is one of considerable importance in the present trend of development for radio reception, so much so that some explanatory comment at this point is appropriate. This feature is embodied in all of my arrangements of automatic correction commencing with the simple arrangement of Fig. 7, and including the more complex arrangements employing the functions of the auxiliary tube VT₄, the bridge system of Fig. 16, and others to follow.

Heretofore the practice of the art has come to recognize two systems of three electrode vacuum tube detection, one known as "grid detection" generally employing low plate potential and slightly positive grid potential and a so-called "grid leak-stopping condenser" in the grid lead. The other, known as "plate detection" employs high plate potential and a negative biasing potential on the grid. These two forms of detection differ in characteristics in that the former is particularly sensitive or responsive to very weak signals, but is not capable of handling strong signals without distortion or overloading. The latter is decidedly insensitive to weak signals, but is adapted to handling strong signals without distortion or overloading, and is accordingly sometimes termed "power detection". It is therefore seen that a system including one of the two forms of detection sacrifices the advantages of the other. The recent practical tendency in the construction of radio receivers is to increase the degree of radio frequency amplification before detection and lessen the amount of audio frequency amplification after detection. This practice therefore requires that the detector be able to handle very strong signal input, particularly so with the reduction of audio frequency amplification and the requirement that the power output amplifiers of present usage be fully operated to satisfactorily actuate the modern so-called dynamic sound reproducers.

The importance of an automatic continuous alteration of detector grid bias with variation of signal energy is graphically illustrated in Fig. 17, in which ordinates represent magnitude of detection response and abscissæ represent negative potential in volts of the detector grid and signal potential in volts impressed upon the biased grid. Graph 6 shows the conditions existing around an initial negative bias of 10 volts. There is most inefficient response to signal currents below 10 volts of intensity, but the length of graph 6 shows the ability of the highly biased tube to handle strong signals when sensitivity is not a factor. Graphs 5, 4, 3, 2 and 1 show the decreasing ability of the biased detector to handle strong signals as the negative bias is decreased, but also show the increasing responsiveness to weak signals with decreasing bias. Thus for uniform detection and ability to handle strong signals when needed throughout the range of signal intensities common to radio broadcasting, for example, arrangement for automatically altering the grid bias with signal intensity variation is particularly desirable.

In my arrangement of Fig. 7 the negative bias on the grid of $VT_1$ automatically increases with signal intensity as the plate current of $VT_3$ in resistance $R_c$ increases, but the range of effectiveness is limited. The increase of bias is a percentage change directly proportional to the percentage of current change of $VT_3$. To secure an actual change of grid potential of useful degree it is necessary to make the initial drop of potential across $R_c$ large so that the percentage change will amount to a noticeable measure of difference of potential. For example, an initial potential of 5 volts will increase to 6 volts upon an increase of the current of $VT_3$ by 20%, thus not providing for a great range of effectiveness judged by the conditions illustrated in Fig. 17. If the initial potential is 1 volt to make the system sensitive for weak signals, the increase with 20% increase of plate current $VT_3$ is to 1.2 volts, thus not providing for handling compartively strong signals.

With the aid of tube $VT_4$ in Fig. 8 the rate of change of the grid bias with signal intensity can be made of a greater rate than the percentage change of current of $VT_3$. Further the degree of change is not dependent upon the initial bias as in Fig. 7, so that the initial bias can be set low or zero for efficient response to weak signals, and increased at a high rate by the action of $VT_4$ for strong signal requirements.

In the arrangement of Fig. 16 the initial bias can be set at zero or as low as desired, and by choosing the values of the balancing potentials of $a$ to $b$ and $a'$ to $b'$ the rate of increase with signal intensity can be made anything desired. For example if $a$ to $b$ and $a'$ to $b'$ are chosen as about 200 volts each, a change of current of 20% in PR will change the grid bias of $VT_1$ about 40 volts. If they are about 20 volts each, a change of 20% in the current in PR will change the bias of $VT_1$ about 4 volts, an amount sufficient for many conditions encountered in practice.

The system of Fig. 18 shows a modification necessary to cause the automatic corrective arrangement of Fig. 16, a three-tube system, to function for automatic correction in a two-tube system. The modification comprises reversing the connections of the grid and filament of $VT_1$ to the potential resistances PR and $PR_1$, the grid being connected to the point $b$ in resistance PR and the filament being connected to the point $b'$ in resistance $PR_1$ in the manner described for Fig. 16. An incoming signal will produce a decrease of plate current of $VT_2$ to decrease the potential across section $a$ to $b$, leaving the greater negative potential of section $a'$ to $b'$ to increase the negative potential of the grid of $VT_1$ to offset the effect of the incoming signal.

The system of Fig. 19 shows an arrangement for automatic bias correction particularly adapted to prevent undesirable feed-back effect. In the arrangement resistances PR and $PR_1$ are connected in parallel, so that the plate current of $VT_2$ divides between them in proportion to the respective resistances of the two paths, so that not only do both paths include direct current components of $VT_2$, but also signal current components and hum current components, all in proportion to the respective resistances of the two paths, but in like phase so far as the fluctuations are concerned because both paths are non-reactive throughout.

In lieu of using an ordinary ohmic resistance in section $a$ to $b$ I employ instead some element that has the characteristic of varying its resistance with variation of current therethrough. For example, I may employ an ordinary illuminating lamp LP having a tungsten filament, the resistance of which filament varies materially and increasingly with increase of current therethrough.

If the resistances of PR and $PR_1$ be so chosen to divide the plate current of $VT_2$ into two components such that for the initial adjustment of the system the potential difference across lamp LP is substantially the same as the potential in section $a'$ to $b'$, or slightly different to give an initial negative bias on the grid of $VT_1$, then upon the arrival of an incoming signal at I, the plate current of $VT_2$ will tend to decrease, thus decreasing the current through lamp LP to decrease its resistance, while the resistance of the section $a'$ to $b'$ remains unchanged. The result is that while the potential across section $a'$ to $b'$ falls because of lesser plate current of $VT_2$, the potential across lamp LP falls at a greater rate, thus producing a differential effect or unbalance to increase the potential of the grid of $VT_1$ negatively in response to the attempted change of plate current of $VT_2$.

The character of lamp LP or other resistance varying element depends materially upon the total differential in volts needed to automatically correct the operation for the contemplated range of variation of intensity of the incoming signals. For example, an ordinary 120 volt-10 watt commercial lamp develops across its filament about 20 volts at about 22 milliamperes of current therethrough. If it is decided to operate for the differential effect between a 20 volt potential in each leg of the bridge, the resistances PR and $PR_1$ must be so chosen as to divide the normal plate current of $VT_2$ into two components such that 22 milliamperes are had in PR. The resistance of section $a'$ to $b'$ must then be chosen such that the balance of the plate current through $PR_1$ develops about 20 volts across section $a'$ to $b'$. I have found that commercial tungsten filament lamps will vary sufficiently in resistance with attempted changes of current in the output circuits of my systems to give differentials of several volts necessary to meet usual requirements.

If the variable resistance element has a negative resistance co-efficient, such as a lamp with a carbon filament, in order to have automatic correction in the right direction in the two-tube system of Fig. 19, it is necessary to reverse either the position of the element from the lower resistance arm PR to the upper resistance arm $PR_1$, or reverse the connections of the grid and filament, the grid to point $b'$ and the filament to point $b$.

Condenser $C'_3$ in Fig. 19 shows another way of by-passing signal current and hum current from the resistance bridge $PR_1$ and PR over that of the location of condenser $C_3$ in Fig. 18, but because this by-passing takes place in series with the filter condensers, such as $FC_2$, it is not as effective in low impedance as the location of $C_3$ in Fig. 18.

Feed-back effect in Fig. 19 is substantially eliminated because both arms $PR_1$ and PR contain signal components which are in phase and therefore neutralize each other on the grid of $VT_1$ when sections $a'$ to $b'$ and $a$ to $b$ are substantially in balance. The temperature lag of lamp LP is too great for permitting it following current variations of the frequency of audio signals and above, so that there is substantially no variation of resistance in LP because of signal current fluctuations to unbalance with section $a'$ to $b'$. When the incoming signal tends to vary the plate current of $VT_2$, there is developed a slight unbalance between sections $a'$ to $b'$ and $a$ to $b$, which acts as an automatic correction and soon substantially overcomes this change in plate current of $VT_2$ so that the residual unbalance is substantially negligible in effect upon feed-back.

Comparing feed-back effect of the automatic corrective arrangement of Fig. 19 with that of Figs. 16 and 18, it is seen that the correcting arms in Fig. 19 are in electrical parallel with respect to the source of signal components in the plate circuit of $VT_3$, and therefore oppose in their effects on the grid circuit of $VT_1$ as do the direct current components. In the arrangement of Figs. 16 and 18 the correcting arms are in electrical series with respect to the source of signal components in the plate circuit of $VT_3$, and therefore always aid in their effects on the grid circuit of $VT_1$, making a balance or near balance in the matter of signal current components impossible.

It is to be understood that various devices, the electrical characteristics of which do not follow Ohm's law, may be substituted in the place of the lamp LP. Such devices are, for example, tubes operating on the principles of gaseous discharge, voltage regulator tubes having substantially constant potential drop between the electrodes thereof with current variable throughout a range of relatively wide limits or a tube or tubes having three or more electrodes, the output impedance of which is varied by the potential applied to the grid thereof by the current flow through the tube and a series resistance, an example of such a structure being shown in detail Fig. 19a.

In Fig. 19a the structure is similar to that of Fig. 19, the changes being made in the element designated PR. In this instance the element PR contains the plate-filament path of one or more radio frequency amplifier tubes RF series related therein, the grid of the tube RF being connected to a point $z$ on the resistance.

In this system also when a signal is impressed upon the input circuit of tube $VT_1$ from the antenna via the tube RF the plate current of tube $VT_2$ lowers. This change in the flow of current through the tube RF changes the grid bias thereof which in turn varies the output impedance of the tube or tubes RF. This action produces a differential voltage, between the points $b$ and $b'$ in the manner described with reference to Fig. 19.

I have previously pointed out the adaptability of my systems for receiving continuous waves without heterodyning, interrupted continuous waves and modulated carrier currents to operate tape recorder relays and like devices in accordance with dot and dash signals, spaced impulses and the like. Since it is always helpful to have one of my systems corrected against any direct current effects, such as may come in by changing tubes having production differences in characteristics, I point out that the systems involving correction by temperature effects, such as the filament of tube $VT_4$ in previous figures, the filament of lamp LP in Fig. 19, and the tubes of Fig. 19a can be used for recording reception by choosing the corrective devices to have such time lag that it will not come into action during the time period of a dash used in dot and dash operation or impulses in other forms of operation. Thus, the corrective arrangement will not interfere with the recording features, but will protect the system against various changes to which it might otherwise be subjected. For example, I have found that with some of my corrective arrangements, that of Fig. 19 for example, I can change the potential of the primary of the input transformer supplying the rectifying and filter system, as well as the heating current for the cathodes, through a range of from about 95 volts to 120 without changing the 50 milliampere current required for a type 350 tube more than 3 milliamperes, which change has little effect on the satisfactory operation of the system.

The system of Fig. 20 is an odd-numbered tube (3-tube) arrangement so that the form of connection of the lamp LP of Fig. 19 for automatic correction must be modified to act in the right direction in the system of Fig. 20. This is done by inserting lamp LP in the upper resistance arm PR as shown for an element of positive resistance-temperature characteristic, though it could be retained in the lower resistance arm $PR_1$ by shifting the grid and filament connections to points $b$ and $b'$ as specified in connection with Fig. 19.

The arrangement of Fig. 20 includes some modifications not previously brought out. For example, I may employ differences of potential developed in elements other than the resistance PR for use in energizing tubes in advance of the output tube. I show as one example of utilizing this feature the connection of the field coil FC of a usual dynamic loud speaker between the points $q$ and $d$ in series with the bridge system PR and $PR_1$. The usual movable coil MC of such a loud speaker, shown attached to the usual sound reproducing cone CN, is shown energized through an output transformer OT in the plate circuit of $VT_3$, the elements being mounted in proper relation to a magnetic system indicated as IC. In this way I utilize the plate current of $VT_3$ for energizing field coil FC of the loud speaker without extra current drain on the filter system and, at the same time, avoid the use of auxiliary apparatus for field energizing. At the same time, the potential developed by the field coil is usefully employed for energizing the plate and grid electrodes of tubes $VT_2$ and $VT_3$, thereby saving some resistance in elements PR and $PR_1$.

The normal plate current of certain of the commercial power amplifier tubes for position $VT_3$ is adequate for energizing the field coils of many of the commercial dynamic loud speakers. It is also to be noted that in the systems of Figs. 19 and 20 the additional resistance $PR_1$ does not increase the current drain on the filter system as is the case of the auxiliary resistance $PR_1$ in Fig. 18, an important feature in saving filter material as previously pointed out.

Another advantage of the location of a highly inductive element, such as the field coil FC, in series with the potential developing elements PR and $PR_1$ is that it cooperates most effectively with signal and hum current by-pass condenser $C_3$ in Fig. 20 and $C'_3$ in Fig. 19 in filtering signal current and hum current from the potential developing resistances without affecting the direct current component needed for energizing potential and automatic correction.

In the arrangement of Fig. 21 I show the shielded grid type of tube as the lead tube of a two-tube system having automatic correction with the aid of a lamp LP as previously set forth.

The shielded grid tube $V_1$ is shown to have its cathode heater element energized from a transformer $FT_1$ independently of the transformer $FT_2$ for the filament type of tube $VT_2$. I previously pointed out in connection with Fig. 13 that I could energize the heaters of indirectly heated cathodes from the same circuit that energizes the filament of a tube of the filamentary type in the same system. In my experience with commercial indirectly heated cathode tube constructions I have found that there occurs in many of them a space current flow between cathode and heater of a few microamperes, so that if the heater of one tube is connected with the filament of another tube while the cathode of the first tube is connected to the filament of the second tube through a difference of potential element, such as the resistance PR, there results a current flow in this auxiliary circuit of a number of microamperes that may give difficulty in establishing the desired potential differences in the resistances PR. For this reason I show the cathodes of tubes $V_1$ and $VT_2$ separately energized as a precaution against a defect in commercial production.

In Fig. 21, I provide with the aid of switches $SW_6$, $SW_7$ and $SW_8$ for employing the shielded grid tube $V_1$ as a normal shielded grid connection by closing switch $SW_6$, a three-electrode connection by connecting the plate and shielding grid together by closing switch $SW_8$ and opening switch $SW_6$, and again a three-electrode connection by connecting the grid and shielding grid together by closing switch $SW_7$ with the other two switches open. As three-electrode connections the usual commercial shielded grid tube acts as an ordinary high $\mu$ tube, the amplification being considerably less than the connection involving the use of the shielding grid.

Some comments as to the adjustments of the initial grid potential and shielding grid potential in using the system in Fig. 21 in a shielding grid connecton are helpful. It is seen that the initial grid bias of $V_1$ is had by relative adjustment of section $a'$ to $b'$ on $PR_1$ and resistance of lamp LP in section $a$ to $b$ on PR. I find from experience with the commercial shielded grid tubes that a slight initial negative bias on the grid of $V_1$ is desirable, this because the so-called "emission pressure" tends to cause current flow in the grid circuit until sufficient negative potential is applied to the grid to overcome the effect, this emission pressure varying between .25 and .9 volts in the tubes I have investigated. There is also required an additional negative potential over and that to offset emission pressure to provide for weak incoming signals not swinging the grid of $V_1$ positive, so that in general I recommend an initial grid bias of $-1.5$ volts. Obviously, stronger signals will produce action of the automatic correction feature to increase the negative potential of $VT_1$ to higher values dictated by the requirements of the stronger signals.

In determining the position $s$ of shielding grid connection on $PR_1$, the potential to be applied through $V_1$ to the grid of tube $VT_2$ by the potential in section $b'$ to $c$ of PR, and the resistance of $R_2$, it is well to fix upon a preselected impedance of cathode-to-plate of $V_1$ as a reference point, and adjust to keep this preselected impedance constant. Having determined that an initial grid bias of 1.5 volts is needed when the plate current of $VT_2$ is normal, variation of the potential of the shielding grid will alter the plate impedance of $V_1$, so that the point $s$ should be selected that for the 1.5 initial grid volts the plate impedance of $V_1$ approximates the preselected value. I have previously pointed out the general rule of having the total potential of $b'$ to $c$ on PR divided approximately equally between cathode and plate of $V_1$ and across resistance of $R_2$, thus pointing the way to selection of the potential of $b$ to $c$ and the resistance of $R_2$. Another guide I have found of use is to maintain the ratio of the potential from cathode to plate in $V_1$ to the potential of the shielding grid in my system the same as the ratio of plate potential to shielding grid potential prescribed for normal operation of types of shielding grid tubes in usual amplifying systems. For example, most of the commercial shielding grid tubes prescribe a plate potential of 180 volts and a shielding grid potential of 72 volts, a ratio of 2.5 to 1. In my system I have found as a general rule an initial grid bias of 1.5 volts requires a shielding grid potential of about 26 volts, and a cathode to plate potential of $V_1$ of about 70 volts (a ratio of about 2.5 to 1), and therefore a total potential from $b$ to $c$ of about 140 volts, the resistance of $R_2$ being in the neighborhood of 1 megohm.

The arrangement of Fig. 21 includes provision for lessening the amount of resistance needed to make up the bridge including PR and $PR_1$ by not commencing $PR_1$ until some intermediate point is reached which leaves enough resistance for $PR_1$ to develop the required potentials needed of it.

With modern shielded grid tubes I have found the system of Fig. 21 extremely efficient in the amplification of low frequency currents and the detection and amplification of carrier currents. For example, I have found the gain in $V_1$ for a shielded grid connection to be of the order of from 80 to 100, which, added to the normal gain of the usual power amplifier $VT_2$ of 3.5, the overall gain of the system runs from about 275 to 350, more than adequate to operate from the usual phonograph pick-up the full output of the powerful 350 type of tube for operating an enlarged type of dynamic loud speaker known as a 12-inch, a rating determined by the size of the reproducing cone.

The system of Fig. 22 illustrates a three-tube arrangement including shielded grid type tubes in positions $V_1$ and $V_2$, tube $V_1$ being connected for shielded grid operation and tube $V_2$ being connected for three-electrode operation by connecting the plate and shielding grid electrodes together.

This arrangement provides for adding to the over-all amplification of the two-tube shielded grid system of Fig. 21 the lesser amplification of the three-electrode connection of $V_2$, thus bringing out a manner of distributing degree of amplification. For example, two shielded grid stages are capable of a gain of from 6,000 to 10,000 which, multiplied by the normal 3.5 gain of $VT_3$, would result in a total gain of from 20,000 to 30,000, too much for usual requirements. By cutting the gain of $V_2$ down to the neighborhood of 15 by the three-electrode connection the overall gain is reduced to the neighborhood of 4,000 to 6,000, a degree of amplication that may be better suited to some practical requirements, such as phonographic reproduction with the aid of a low impedance, low amplitude of motion, phonographic pickup so designed to prevent distortion.

It is also obvious that the very high degree of amplification shown without distortion makes the system particularly suitable in connection with sound reproduction in systems using photoelectric cells which are notoriously feeble in response and must be followed by enormous amplification to be effective.

The arrangement of Fig. 23 shows how I adapt my systems to so-called "push-pull" operation. There are shown two complete amplifiers like that of Fig. 22 whose outputs jointly operate into a usual "push-pull" output transformer OT. The inputs of these two systems are shown connected for alternate operation from an indicated phonograph pickup PU across two input resistances IR and IR', the degree of input being controllable by a variable resistance $R_{20}$.

I have indicated the second tubes $V_2$ and $V'_2$ in each of the systems arranged with connections by switches $SW_6$, $SW_7$, and $SW_8$, for connection as either shielded grid or three-electrode operation as previously described and have used a system substantially that of Fig. 22 with all of the several connections possible with these switches with satisfactory operation in each instance.

For automatic correction of the system of Fig. 23, I include a compensation resistance CR of the order of 50,000 ohms connected between input and output ends neutral to both systems and in parallel with potential resistances PR and PR'. The resistance is made high because there is no need for large current in its particular function, thus relieving excess current drain on the filter system.

The potential section $n$ to $r$ on resistance CR acts with section $a$ to $b$ and section $a'$ to $b'$ for automatic compensation of both systems. While there is practically no signal current component in resistance CR, and therefore section $n$ to $r$, to balance with signal current components in sections $a$ to $b$ and $a'$ to $b'$ to prevent feed-back effects, yet the system is substantially free from feed-back effects for the reason that the push-pull connection of the input system has the effect of neutralizing all signal current components from resistances PR and PR', this being aided by signal current by-pass condenser $C_3$ interconnecting the points $d$ in PR and $d'$ in PR'. It is seen that by reason of the push-pull input connection when the current of $VT_3$ tends to increase by reason of a positive signal potential on the grid of $V_1$ the current of $VT'_3$ tends to decrease by reason of the negative potential on the grid of $V'_1$. An alternating or fluctuating change of current in the plate circuit of $VT_3$ is reflected in both resistances PR and $PR_1$, while the same is true of alternating or fluctuating currents in the plate circuit of $VT'_3$, and since the signal current effects are opposed in the plate circuits of these two tubes the effects are likewise opposed in PR and PR'.

I show a reversing switch $SW_9$ connected to reverse the polarity of one section of the primary of push-pull output transformer OT. One use of such an arrangement is balancing the two components of the system for equal action. If switch $SW_9$ is connected so that the signal current output is opposed in its transfer to loud speaker LS, then if the two systems are performing the same there will be no response. By adjusting the input to one or the other halves of the system, as by varying resistance IR', a balance indicated by silence can be had. The switch $SW_9$ can then be reversed with the assurance that both halves of the amplifier are performing alike.

An advantage of the push-pull system of Fig. 23 is that one-half of the system can become inoperative without interfering with the operation of the other half. The result is less, but no greatly noticeable difference, in sound output, so that such a system could be continued in use with one-half out of operation without the listener being cognizant of the fact.

The arrangement of Fig. 24 shows a manner of using a substantial positive potential on the grid of the output power amplifier $VT'_3$ in lieu of the usual substantial negative potential on the grid of this tube, tubes $V_1$ and $V_2$ being shown as shielded grid tubes connected for three-electrode operation by connecting the plate and shielding grid elements together. As one example of an arrangement of such a system I employed a commercial tube type 852 having a filament requiring 3.25 amperes of heating current at a potential of 10 volts and a plate current of 60 milliamperes at a plate potential of approximately 600 volts. With this type of tube connected in the system as shown the section of PR between $c$ and $q$ adds a potential of 50 volts and the section $d$ to $v$ a potential of 100 volts, leaving the grid of $VT'_3$ sufficiently positive to draw 4 milliamperes of grid current when the plate circuit of $VT'_3$ was energized at about 550 volts. While such a grid current condition would be wholly destructive to the usual amplifier system, it was found that with either a resistance $R_3$ or a choke coil $CH_3$ connected by way of switch $SW_{11}$ the action of the output of tube $V_2$ on the grid of tube $VT'_3$ would modulate effectively the current of tube $VT'_3$, the result being good quality of reproduction and substantial amplification, though not of the same order as that had with a negative bias on the grid of the output power amplifier.

The other details of the arrangement of Fig. 24 are substantially as previously outlined for other systems.

The arrangement of Fig. 25 includes a modification of the manner of connecting a high mu or shielded grid tube to a power amplifier output tube resulting in a substantial increase in gain. The tube $V_1$ is indicated as of the shielded grid type operated as a three-electrode tube by connecting the grid and shielding grid together. It is seen that the filament of $V_1$ is connected directly to the grid of $VT_2$ and the plate of $V_1$ is connected directly to the plate of $VT_2$ through switch $SW_{12}$, or by the same switch to the filament side of output transformer OT, the latter connection showing a greater gain over the former.

With the type 345 tube requiring 250 volts plate potential I employ a potential across resistance PR of 150 volts and a resistance at $R_{10}$ of about 2.5 megohms. I found that the system with the constants as given was most sensitive with a positive potential of about .3 volt impressed on the grid of $V_1$, through potentiometer P, the grid circuit drawing a few microamperes of current at such adjustment.

With this form of connection the gain was from one and one-half to two times that had with the same devices in the usual form of connection of my system, for example Fig. 21.

In Fig. 25a, I have shown a system utilizing two or three tubes with a phonograph pickup device consisting of PU and $R_{20}$ or PU' and $R'_{20}$ hereinbefore described, and in which the grids of all of the tubes are operated with a positive bias relative to the filaments thereof. In this case the resistance PR is shunted across the filter condenser $FC_2$ of the source of fluctuating current FS in such a manner that point $a$ can be considered as the low potential terminal of the resistance PR and the point $c$ is the high potential point thereof.

Considering first the two-tube system, which is produced by closing switch $SW_{17}$, opening switch $SW_{16}$, closing switch $SW_{14}$ to its lower contact, and closing switch $SW_{15}$ to its highest contact, we have a system comprising two tubes $V_2$ and $VT_3$, tube $V_2$ being a four element tube of the type 224 hereinbefore described, in which the shield grid thereof is directly connected to the plate thereof. In this instance the potential across the filament-plate path of tube $VT_3$ is supplied from the points $a$ and $c$ of the resistance PR through the primary of the output transformer OT connected to the loud speaker LS. The cathode of the tube $V_2$ is directly connected through its center tap potentiometer to the grid of tube $VT_3$, the plate of tube $V_2$ being connected to a predetermined point $m$ in the resistance PR. An analysis of this circuit shows that the grid of tube $VT_3$ is maintained at a positive potential relative to the filament thereof by the current flow through the tube $V_2$ in the following manner. Assuming the point $a$ as a source of electron movement, the flow of electrons through the filament-plate path of tube $V_2$ is from point $a$ to the filament of tube $VT_3$, to the grid of tube $VT_3$, to the filament of tube $V_2$, to the plate of tube $V_2$, to the point $m$ in the resistance PR, and return to the point $a$.

With the switches $SW_{14}$ and $SW_{15}$ closed in the manner hereinbefore described, potential developed across the resistance $R_{20}$ by the pickup device PU causes a variation in the filament-to-plate current of tube $V_2$ which of itself causes a variation in the grid current of tube $VT_3$, changing the potential of the grid of tube $VT_3$ relative to its filament. This variation in the potential in the grid of tube $VT_3$ produces a change in the current flowing through the primary of output transformer OT, producing audible signals in the loud speaker LS.

When it is desired to add another tube $V_1$ to this system the following changes may be made. The pole of switch $SW_{15}$ is moved to its lowest contact point connecting a battery B poled as shown between the grid of tube $V_2$ and the filament of tube $V_1$. The arm of switch $SW_{14}$ is moved to its upper contact point and switches $SW_{16}$ and $SW_{17}$ are left in the condition previously described.

The flow of current through the tubes $VT_3$ and $V_2$ remain the same as in the previous case. Assuming the negative terminal of the battery B to be a source of electron movement for the plate current of tube $V_1$, which is a tube similar to tube $V_2$, the flow of the electrons is from the battery B to the filament of tube $V_1$, through the space current path thereof to the plate, to the filament of tube $V_2$ via the switch $SW_{14}$, to the grid of tube $V_2$ and return to the positive terminal of the battery B via the switch $SW_{15}$. The potential developed across the grid-filament circuit of tube $V_1$ modulates the space current of the tube $V_1$, which in turn causes a variation in the grid current of tube $V_2$, changing the potential thereof relative to its filament in a manner similar to the change of potential developed thereon by the pickup device PU, which in turn causes the tubes $V_2$ and $VT_3$ to operate in the manner hereinbefore described.

In case it is desired to eliminate the use of the battery B and derive the energization of the entire system from the source SF, the following changes may be made. The arm of switch $SW_{15}$ is moved to its middle contact, the switch $SW_{14}$ is opened, the switch $SW_{16}$ is closed and the switch $SW_{17}$ is opened. In this instance the flow of plate current through the tube $V_2$ causes a drop in potential across the resistance $R_{21}$, which may be used to energize the filament-to-plate path of tube $V_1$. Assuming $R_{21}$ to be a source of electron movement, the flow thereof from the resistance $R_{21}$ through the tube $V_1$ is from the resistance $R_{21}$ to the filament of $V_2$, to the grid of $V_2$, to the filament of $V_1$ via the switch $SW_{15}$, to the plate of the tube $V_1$ and back to the resistance $R_{21}$ via the switch $SW_{16}$. In such an arrangement the potential developed by the pickup device PU' impressed upon the grid-filament circuit of tube $V_1$ produces signals in the indicator LS in the manner hereinbefore described for the various operations of the different tubes. Condenser $C_y$ is a signal and hum current by-pass of low impedance serving like function to its use in previous figures. $C_x$ is a signal current by-pass condenser in shunt to resistance $R_{21}$.

The arrangement of Fig. 26 embodies another modification of the mode of connection of the input tube $V_1$ to the output tube $VT_2$. In this case the cathode of $V_1$ is connected to the grid of $VT_2$ through a two megohm resistance $R_{10}$. The plate of $VT_1$ is connected to the mid-potential point of a connection between the grid and plate electrodes including resistances $R'_{10}$ and $R''_{10}$, each of about two megohms for the same tubes referred to in connection with Fig. 25. The shielding grid is also connected for operation by choosing a suitable positive potential for it on resistance PR. With this form of connection it was found that operation was satisfactorily had with and without bias potential on the grid of $V_1$. As in the case of the system of Fig. 25 the amplification is high and the operation otherwise satisfactory.

As a further modification I find that by slight readjustments of the potentials on the shielding grid and grid of $V_1$, I can eliminate the resistance $R_{10}$ as by excluding or short circuiting through switch $SW_{13}$, and still maintain a high efficiency of the arrangement without derogatory effect.

The arrangement of Fig. 27 includes provision for most effective automatic correction and grid bias modifications for incoming signals having a very wide range of intensities without the use of variable resistance elements, such as the lamps, previously described. In the two-tube system shown, $V_1$ is of the shielded grid type connected for shield grid operation, $VT_2$ being the usual output power amplifier. I connect a resistance $R_{11}$ between the cathode of $V_1$ and the point $b$ in resistance PR of the order of from .1 to .25 megohm to develop a substantial potential due to current in the shielding grid connection and plate current through $V_1$. I also connect the grid of $V_1$ to a point of positive potential $k$ in resistance PR, such that there is a near balance between the developed potential in $R_{11}$ and section $b$ to $k$, or a difference in balance to give the desired initial potential on the grid of $V_1$. Thus connected, the arrival of a carrier current will be rectified in the shielding grid connection and plate circuit of $V_1$ to increase its current and thereby increase the negative potential across resistance $R_{11}$. At the same time the plate current of $VT_2$ will tend to fall to decrease the potential across section $b$ to $k$, thus giving a double acting differential effect to make the grid bias of $V_1$ more negative and automatically correct the system. Thus, if the initial potentials across $R_{11}$ and section $b$ to $k$ are of the order of 40 volts each, and an incoming signal changes the current in $R_{11}$ by 25%, and therefore the potential 10 volts, while at the same time the potential across section $b$ to $k$ is reduced in like amount, the change of bias on the grid of $V_1$ is a total of 20 volts, thus making the system capable of handling almost any range of change of intensity of incoming signal encounterable in practice. Since the resistance of $R_{11}$ is very high I find that I can most effectively filter signal currents and hum currents from the grid circuit of $V_1$ by the use of a by-pass condenser $C_2$ of reasonable value, .5 microfarad for example, so that so filtered there is little difficulty with hum current and feed-back effects.

It is readily seen that the automatic correction and biasing effects of an arrangement like that of Fig. 27 are ideally suited to handle the conditions illustrated graphically in Fig. 17.

Fig. 27 includes another feature through the use of resistance $R'_2$ and condenser $C_8$. With this connection of $R'_2$ to a potential more positive than the point $c$ to which the filament of $VT_2$ is connected, I can, by selection of the relative values of resistances $R_2$ and $R'_2$, produce substantially the same effect as connecting the resistance $R_2$ to a potential developing element more positive than the point $c$, thus allowing for selecting a phantom positive connection for the reason set forth in connection with point $q$ in Fig. 15 in the absence of a resistance potential element elsewhere. Since resistance $R_2$ is always of the one megohm and above order, the resistance $R'_2$ will be very large and therefore permits of a high degree of filtration for hum currents in connection with a condenser at $C_8$ of about .5 microfarad.

Fig. 27a illustrates an improvement feature for my systems applied by way of example to the system shown in Fig. 27. The tubes $V_1$ and $VT_2$ are energized in the manner described with reference to Fig. 21, and the automatic correction and grid bias modification of Fig. 27 supplants the lamp arrangement of Fig. 21.

In the arrangement of Fig. 27a by the proper adjustment of the constants thereof the hum in the loud speaker LS may be reduced to a minimum in the manner described with reference to Fig. 13 (see pages 35 to 37). In addition to this feature I have added a condenser HBC of about 0.1 microfarad when $C_2$ has a value of 1.0 microfarad connected between the point $j$ and the point $o$ on the resistance PR. By proper selection of the point $o$ along the resistance PR an alternating current is impressed on the grid of $V_1$ of such a magnitude and phase that any residual high and low frequency hum components in the system may be nicely neutralized out of the signal currents flowing through the loud speaker LS.

In other words, the arrangement is a sort of vernier adjustment to produce a neutralizing hum component of either phase and of desired magnitude as a clean-up effect for final adjustment in a given design. It is of particular value for a readjustment on changing tubes in the system, it being usual that commercial tubes vary in degree of hum production.

In such an arrangement I have not been able to detect any noticeable feed-back effect on the signal current component of the energy flowing through the loud speaker LS such as tonal distortion commonly accompanying hum bucking arrangements, when such a system is used for speech and musical reproduction.

The arrangement of Fig. 28 shows provision for employing the automatic grid bias arrangement of Fig. 27 in connection with the detector tube of the usual transformer coupled amplifier system. Tube D may be any three or more electrode tubes suitable for detection purposes, having its output coupled to a power amplifier $VT_2$ for example through an audio frequency transformer AT, the power amplifier having its plate energized by the full potential of a filter system as indicated and the detector tube having its plate energized by a lesser potential due to a reduction in resistance $R_{13}$ the condenser $C_3$ serving as a signal current by-pass and additional filter in connection with resistance $R_{13}$ for the better filtration needed by the detector tube followed by amplification.

The detector tube is shown supplied with the usual high frequency input system comprising a transformer T and tuning condenser TC.

The filament of $VT_2$ is shown connected to the negative side of the filter system through a resistance $R_{12}$ for developing a negative potential for the grid of $VT_2$.

I show between the filament of detector tube D and the negative terminal of the filter system a resistance $R_{11}$ as in the case of Fig. 27, the potential of which is placed in near balance with a positive potential in resistance $R_{12}$ to which the grid of detector tube V is connected at some selected point $x$, thus allowing for initially choosing the potential of the detector grid as desired.

Since the usual power amplifier tube $VT_2$ requires as much as 50 volts for biasing, there is available this much potential for balancing with the potential across $R_{11}$, so that if $R_{11}$ be chosen with the normal plate current of detector tube D to produce 50 volts, it is apparent that an increase of the plate current of detector D by 50%, as will be had in the case of a strong signal, the potential across $R_{11}$ will become 75 volts, resulting in an unbalance of 25 volts to produce 25 volts negative potential on the grid of detector tube D, an amount capable of handling substantially any signaling conditions that may be encountered in practice.

In the arrangement of the system of Fig. 28 there will be no change in the current of resistance $R_{12}$ to bring about a double differential action as in the case of Fig. 27, but the possibilities are adequate without this additional feature.

The arrangement of Fig. 29 shows by way of example a mode of connecting my detector-amplifier systems to conventional radio frequency amplifier systems, the system of Fig. 27 having its input selectively supplied with radio frequency signal energy amplified in tube $V_3$. The details of the detector-amplifier system are as set forth in connection with Fig. 27 and require no repetition.

Radio frequency amplifier $V_3$ is shown as of the shielded grid type connected for shielded grid operation. There is shown a selective input from an antenna A, or other suitable selector, through a transformer $T'$ and tunable condenser $TC'$.

The plate circuit is shown coupled to a transformer T to the selective input system of V1 and energized from a connection to the positive end c of resistance PR, sufficient potential being available in PR for the usual commercial shielded grid tube. The plate circuit of V3 is completed by a connection of its filament to the point b near the negative end of PR. The shielding grid of V3 is shown energized by a connection to a point s' in PR of suitable positive potential for this purpose. The grid of V3 is shown negatively energized through a connection to the negative end of the filter system in order to have available the potential developed across the section of resistance PR included between points m and b. Each of the potential connections of V3 to resistance PR includes a choke coil $CH_{10}$, $CH_{11}$ and $CH_{12}$, these choke coils being by-passed for signal currents by condensers $C_{10}$, $C_{11}$ and $C_{12}$ respectively.

Since the total current needed by the radio frequency system for energizing the grid, shielding grid and plate electrodes is considerably less than the plate current of power amplifier $VT_2$, and will be in case of the use of a plurality of radio frequency amplifier tubes, the total current needed for radio frequency energization can be extracted from resistance PR, thus avoiding any additional drain on the filter system when operating my system with radio frequency amplifiers, again providing for maintaining filtration for a complete system most economical.

The arrangement of Fig. 30 shows a more extended use of my detector-amplifier system with radio frequency amplifier systems, and includes novel features in both the reactively coupled radio frequency amplifier portion and the detector-amplifier portion, and novel features incidental to coordinating the two portions.

The radio frequency portion is shown to have four stages of radio frequency amplification including tubes $V''_1$, $V''_2$, $V''_3$ and $V''_4$ with associated energizing and tunable circuits. The detector-amplifier portion is shown to include three stages comprising tubes $VT'_1$, $VT'_2$ and finally $VT_3$ and $VT'_3$ in parallel relation, and associated energizing, input, output and signal energy transfer circuits as previously set forth in detail.

All of the tubes except $V''_4$ and $VT_3$ and $VT'_3$ are indicated as of the indirectly heated cathode type, the exceptions being indicated as of the filamentary cathode type. In all cases the heaters of the indirectly heated cathode type and the filaments of the exceptions are indicated as supplied with raw alternating current conventionally, the details for such heating having been previously set forth.

The system is shown to include suitable connections for deriving the energizing potentials for the plate electrodes of all of the tubes, the grid electrodes of all of the tubes, and the shielding grids of those tubes of the shield grid type from the same source SF of unidirectional current, which may be the usual rectifier system for alternating current followed by a suitable filter system indicated by filter output condenser $FC_2$, details for which have been previously outlined.

The entire potential output of source SF is shown connected across the parallel filament-plate impedances of tubes $VT_3$ and $VT'_3$, the field coil FC of a dynamic loud speaker, the resistance PR and the lamp LP, an arrangement previously set forth in detail in connection with a three-stage detector-amplifier system, the lamp LP being so connected in the portion a to b of the grid circuit of $VT'_1$ to cooperate with the portion a' to b' in resistance PR' to bring about automatic correction in the manner previously outlined.

Tubes $VT'_1$ and $VT'_2$ of the detector-amplifier system are shown as of the shielded grid type connected for shield grid operation in accordance with details previously set forth, it being understood, however, that other tubes of the three-electrode type may be used, or that shielded tubes connected for three-electrode tube operation in manners previously outlined may be substituted. Also that the number of stages in the detector-amplifier system may be reduced or increased as amplification may demand in accordance with specifications hereinbefore set forth.

The operation of output tubes $VT_3$ and $VT'_3$ in parallel relation as shown doubles the amount of current taken from source SF, an arrangement which may be desirable when the type of power amplifier employed at $VT_3$ and $VT'_3$ does not give individually as much undistorted output energy as may be considered needed for correct tonal reproduction, and further facilitates obtaining the amount of energy that may be needed to energize the field coil FC of a dynamic speaker connected as shown without developing a greater potential than is needed for energizing the plate electrode of tube $VT'_2$ and the grid electrodes of tubes $VT_3$ and $VT'_3$, it being obvious that if the current is low a higher resistance winding for field coil FC may be needed, thus developing across field coil FC a greater potential than is required for the tubes.

Primary windings $AP_1$ and $AP_2$ of output transformer $T_1$ consolidate in secondary winding AS the signal current energy of tubes $VT_3$ and $VT'_3$ in proper phase to actuate movable coil MC of the dynamic speaker for actuation of the sound reproducing element LS attached to the movable coil.

An arrangement is shown for connecting through switch $SW_{17}$ a phonographic device or pick-up PU in the grid circuit of tube $VT'_1$ in order that the system may be used either for phonographic electrical reproduction or radio reproduction, the volume for phonographic operation being controllable through variable resistance $R_{20}$. Closure of switch $SW_{17}$ short-circuits the phonographic device out of operation.

It is to be understood that the values of resistances $R_2$ and $R_3$, and the potentials on the plate electrodes, the grid electrodes and the shielding grid electrodes are to be chosen in accordance with details heretofore given. Also that by-pass condenser $C_2$, $C_5$, $C_3$ and $C_4$ are for the purposes heretofore described in detail, and are to be chosen in values accordingly.

The radio frequency system is shown to start with an antenna A, or other suitable collector of radio signaling energy, connected to a common ground X of the system through a resistance AR and condenser XC. The first radio frequency tube $V''_1$ is shown as of the shielding grid type, connected with the antenna in the manner of the usual so-called "coupling tube" in that the antenna circuit is rendered aperiodic by the resistance AR, and the grid of the tube is directly connected to this aperiodic antenna system. In this way I avoid introducing antenna effects, such as are used by different users of different lengths of antenna wire, upon the calibration of the highly selective tuning system following coupling tube $V''_1$.

I find the shielding grid type of tube particularly effective as a coupling tube in that the usual inherent grid-plate capacity of the ordinary three-electrode tube is eliminated in the shielding grid type, thereby more completely isolating the highly selective tuning system following the coupling tube from undesirable antenna effects, and I will later point out other advantages for using the shielding grid type of tube in the position of first radio frequency amplifier.

I show the output circuit of tube $V''_1$ connected to the tunable input circuit of tube $V''_2$ through a usual transformer element comprising primary $P_1$ and secondary $S_1$, the plate electrode of tube $V''_1$ being energized through a suitable high frequency choke coil $CH_1$ by way of an indicated connection to the positive side of the source SF, a stopping condenser $SC_1$ preventing this high potential from being applied to the grid of the succeeding tube $V''_2$. Since the cathode K of tube $V''_1$ is shown connected through the point $d$, the potential applied to the plate of tube $V''_1$ is the difference of potential between the point $d$ and the positive potential side of the source SF, it being understood that the point $d$ can be chosen to lie in any part of the system needed to give the required potential on the plate of $V''_1$.

Condenser $BC_3$ is common to the output circuit of tube $V''_1$ and the tunable input circuit of tube $V''_2$, thereby forming an electrostatic coupling between the two circuits to supplement the electromagnetic coupling had between primary $P_1$ and secondary $S_1$. By properly poling the electromagnetic transfer to phase with the electrostatic transfer, and choosing the relative values of the two transfers, the combined energy transfer can be maintained substantially constant with frequency, or to vary with frequency in a desired manner, as provided for more in detail in my copending application Serial Number 48,936 of August 8, 1925. The radio frequency choke coil $CH_2$ provides a conductive path around the coupling condenser $BC_3$ to permit energizing the grid of tube $V''_2$.

The cathode of coupling tube $V''_1$ is connected to the point $d$ in the system through which the plate current of tubes $VT_3$ and $VT'_3$ passes to the negative side of the supply source SF, and the grid of this tube is connected to a potential point $d'$ in auxiliary resistance PR'' at the same potential as the point $d$, or some different potential in order to establish an initial bias potential on the grid of tube $V''_1$, which connections provide for automatic volume control with varying intensity of incoming radio signals by automatically controlling the grid bias of coupling tube $V''_1$. If a strong incoming signal, transferred thorugh the radio frequency portion to the detector-amplifier portion, tends to alter the plate current of tubes $VT_3$ and $VT'_3$ through field coil FC and resistance PR, the potential of the point $d$ will change with respect to the potential of the point $d'$ in resistance PR'', thereby altering the grid bias of coupling tube $V''_1$ to change the amplifying ability of $V''_1$, thereby altering the signal intensity introduced by coupling tube $V''_1$ to the rest of the system for automatic control volume of signal output from loud speaker LS. A shielded grid type of tube is quite sensitive to grid bias effect on amplification, which is another important reason for employing the shielded grid type of tube as a coupling tube, or as a type of tube in any position in which volume control is had by control of grid bias potential.

The shielding grid of tube $V''_1$ is shown connected to potential point $u$ in resistance PR'' more positive than potential point $d$ to which the cathode is connected thus providing for applying the required positive potential to the shielding grid.

The cathode of tube $V''_2$ is shown connected to a point $w$ in resistance PR'' more positive than the point $a$ to which the grid is connected, thereby providing for a negative bias potential on the grid of tube $V''_2$.

The output circuit of tube $V''_2$ is shown coupled to the tunable input circuit of tube $V''_3$ by a simple transformer coupling through primary $P_2$ and secondary $S_2$ as another mode of interstage coupling. Since the cathode of tube $V''_2$ is connected to the potential point $w$ in PR'' and the plate to potential point $u$, the plate potential applied to $V''_2$ is positive and equal to the difference between the potentials at points $w$ and $u$. The shielding grid of this tube is connected to point $e$ in PR'' positive to the point $w$, thus giving the shielding grid the required positive potential.

The output circuit of tube $V''_3$ is shown coupled to the tunable input circuit of tube $V''_4$ through the combined electromagnetic and the electrostatic coupling arrangement described in connection with tube $V''_1$, the electromagnetic coupling being that due to the mutual relation between primary $P_3$ and secondary $S_3$, and the electrostatic being that due to coupling condenser $BC_8$. Since the input circuit of tube $V''_3$ is a tunable circuit, as compared to the aperiodic input to tube $V''_1$, the coupling of a tunable circuit to the output of tube $V''_3$ brings in a tendency to produce oscillation by way of the grid-plate capacity of the tube, this tube being of the three-electrode type having no shielding grid to overcome this internal capacity, and the oscillation being certain to take place if the interstage coupling used for energy transfer between tubes $V''_3$ and $V''_4$ is sufficiently tight to produce enough reaction through the grid-plate capacity to create oscillatory regeneration. To avoid this I include a condenser $SC_2$ in series with the output circuit of tube $V''_3$ of such capacity as to overcome the inductive reaction of the tunable circuit in the input of tube $V''_4$ back on to the output circuit of $V''_3$, as described more in detail in Loftin et al. United States Patent 1,675,186, of June 26, 1928, and Loftin United States Patent 1,686,755, of October 9, 1928.

The plate electrode of tube $V''_3$ is energized through a suitable radio frequency choke coil $CH_3$ connected to the positive potential point $d$, while the cathode of this tube is connected to the negative potential point $a$, thus giving a required positive potential for energizing the plate electrode of this tube. The plate current of tube $V''_3$ is caused to pass through a resistance $BR_3$ to create a negative biasing potential for the grid of this tube in a well known manner. The oscillation prevention condenser $SC_2$ also acts to prevent the high positive potential on the plate of tube $V''_3$ from being applied to the grid of tube $V''_4$.

The output circuit of tube $V''_4$ is shown coupled to the tunable input circuit of tube $VT'_1$ of the detector-amplifier system through the usual radio frequency transformer. Since the detector-amplifier system I have described places a very small load on its tunable input circuit compared to the load placed on the tunable input circuit of the usual connection of a tube as a detector, the reaction of the tunable input circuit of tube $VT'_1$ back on to the output circuit of tube $V''_4$ is most pronounced, giving a much greater tendency for producing oscillation by reaction through the internal capacity of the preceding tube than is had with the usual degree of coupling between the last radio frequency amplifier stage and the detector stage of a tuned radio frequency system, so that means for preventing oscillation is especially necessary in making such association with my detector-amplifier system. As one example of an effective method for preventing oscillation I show the arrangement contained in copending application Serial Number 207,618, filed July 22, 1927, of Edward H. Loftin and myself. In this arrangement condenser SC3 permits the passing of some of the amplified energy from the output circuit of tube V''4 back to the interstage coupling between tubes V''3 and V''4 out of phase with the initial energy in the tunable grid circuit of V''4. By selecting the right capacity value for condenser SC3 the normal required interstage coupling can also be used for this neutralizing effect, the amount of neutralizing energy being of course controllable by a chosen capacity of condenser SC3. The same adjustment of combined electromagnetic and electrostatic coupling for constant energy transfer with frequency, or any desired rate of change of energy transfer with frequency, permits of the same nicety of control over the neutralizing feed-back with frequency.

Passing the plate current of tube V''4 through resistance BR4 develops a grid biasing potential for this tube, and the choke coil CH4 provides a conductive path around coupling condenser BC8 for the grid biasing potential.

Condensers BC1, BC2, BC4, BC5, BC6, BC7, and BC9 in the radio frequency portion are signal current by-pass condensers of suitable capacity to provide low impedance for the signal currents according to the usual practice in the construction of such systems.

Since the current required for operating the circuits connected to auxiliary resistance PR'' is not great, being very small compared to the plate current required for tubes VT3 and VT'3, the resistance of PR'' can be large, thereby keeping the excess demand on the filter system quite small.

The dotted line interlinking the grounded, or low potential, elements of tuning condensers TC1, TC2, TC3, and TC indicates that these elements may be mechanically interlinked to operate from a single drive mechanism to afford what is commonly termed a "single dial control", in which event the circuits must be so designed as to uniformly permit of matching throughout the range of frequencies for which the system is intended to be used, a practice now well understood.

The art is quite familiar with an effect often had in dealing with amplifier systems popularly termed "motor-boating", a disturbance of periodic character sometimes as low, or even lower, in period as a few cycles per second. This form of disturbance is particularly encountered in the so-called resistance coupled type of amplifier, and is due to the condensers and resistances used in such systems forming means for storing and slowly discharging quantities of electrical energy. Such effects can also be had in some of the systems I have herein outlined, and may even be more pronounced than in the resistance coupled type of amplifier if proper precautions for avoiding these effects are not taken. In order that the matter may be more fully understood I am making special reference to these effects and the avoidance of them in my systems.

In many of the systems I have described for use with steady sources of potential for energizing, such as batteries, I employ connections such that the signal currents are subject to regeneration or degeneration applications, as by impressing potentials developed by signal carrying plate current of the output tube back onto the grid circuit of the input tube. In the systems energized from alternating current sources there is, in addition to the signal currents, fluctuating or hum producing current from the energizing source. It is of course desirable to be able to control the amount of signal current reimpressed or hum current impressed upon the grid of the leading tube, though hum neutralization or desired regeneration may make it desirable not to eliminate entirely impressing these currents on the grid of the input tube.

The question may reasonably be asked as to why the grid of the input tube, Fig. 16, for example, cannot be relieved of some low frequency signal current that might tend towards regeneration or de-generation and hum current by filtering these out of the grid circuit of the input tube by the use of a high resistance, for example, between the point b' and the connection of the condenser C2 to the grid lead. In trying to accomplish this result I found that with resistances sufficiently high in value to be effective as filter elements for hum currents of 60 cycles and harmonics thereof, and audio frequency signal currents, motor-boating would invariably be had of periods dependent upon the resistance value and the capacity value of C2. Choke coils of sufficient inductance to be effective as filters in lieu of high resistances also give the same results.

In such an arrangement as that of Fig. 19 including a lamp resistance attempt to filter the grid circuit as above described usually results in motor-boating at some period influenced by the thermal characteristics of the filament of the lamp LP.

In a system such as that of Fig. 27 I find that effective filtration of hum and signal currents from the grid circuit of the input tube can be had without the motor-boating troubles. In the arrangement of Fig. 27 I use a potential producing resistance R11, and because of using it differentially with the section b to k of resistance PR, resistance R11 can be made of very high value, such as 100,000 ohms and above, quite enough for good low frequency current filtration in conjunction with a condenser C2 of sufficiently large capacity, such as .5 microfarad, for low audio frequency current impedance.

This lack of motor-boating tendency when the resistance is connected in the filament lead common to the grid and plate circuits is due to the face that any plate current change tending to bring about a motor-boating effect is offset through the change of current in resistance R11 changing the potential on the grid in direction tending to prevent plate current change. In a system including a shielding grid, as is shown in Fig. 27, the current in the shielding grid connection tends to change in the same direction as the current in the plate circuit, but I find that the off-setting effect of the grid is sufficient to prevent motor-boating effects even under these circumstances.

I have also found that attempts to isolate the shielding grid of an arrangement such as Fig. 27 by attempts at filtering in the manner I have described in connection with the grid circuit also result in motor-boating effects except where a high resistance is in the filament lead common to the grid circuit and the shielding grid circuit.

Because of these motor-boating tendencies arising when improper choice of constants and locations of them are had, I have endeavored to state in considerable practical detail procedure for practice that will permit avoiding them.

While I have described my systems around a variety of commercial types of tubes, and specified specific electrical constants and other features by way of explanation and practical assistance towards an understanding of the features thereof, no limitations are intended by the selections I have made for explanatory purposes, the invention being one of broad application as set forth in the appended claims.

Having described my invention what I claim is:

1. In a direct coupled electron tube system, the combination of a source of energy, a plurality of electron tubes, impedance output and input circuits coupling said tubes in cascade, means for energizing electrodes of said tubes from said source so that the filament-plate impedance of each preceding tube is of the same order as the impedance input to the next succeeding tube of said cascade, a frequency selective impedance within the plate-cathode circuit of the last tube of said cascade, and a non-selective impedance common to at least one of said input and to at least one of said output circuits for producing regeneration of all frequencies as an inverse function of the impedance to said frequencies of said frequency selective impedance.

2. In a direct coupled electron tube system, the combination of a source of energy, a plurality of electron tubes, impedance output and input circuits coupling said tubes in cascade, and means for energizing electrodes of said tubes so that the cathode-plate impedance of each preceding tube is of the same order as the impedance input to the next succeeding tube of said cascade, a signal input system for the first tube of said cascade, means series related between the space current path of the last tube of said cascade and said source for determining the grid bias of one or more tubes of said cascade, said means including a three-electrode discharge tube, the cathode of which is series related between said space current path and said source, another electrode of which is connected directly to the grid of said first tube, the other electrode of which is connected to the grid of said first tube through said signal input system, and means for impressing an electrical potential between said last mentioned electrode and the cathode of said discharge tube.

3. In a direct coupled electron tube system, the combination of a source of energy, a four-electrode electron tube and a succeeding three-electrode vacuum tube, an input circuit for said four-electrode tube, impedance output and input circuits coupling said tubes in cascade, means for energizing electrodes of said tubes from said source so that the filament-plate impedance of said four-electrode tube is of the same order as the impedance input to the three-electrode tube, and means series related between the space current path of said three-electrode tube and said source for maintaining the average space current of the four-electrode tube substantially constant.

4. In an electrical system, the combination of a source of energy, an output tube, means connecting the space current path of said tube across said source, a second tube, a potential developing element series related between the space current path of said output tube and said source, and means for supplying the potential for the plate current of said second tube from the potential developed by the space current flowing through said potential developing element.

5. In an electrical system, the combination of a source of energy, an output tube and a preceding tube arranged in cascade, means for energizing electrodes of said tubes from said source, a potential developing element series related between the space current path of said output tube and said source, means for supplying the plate current of said preceding tube from space current diverted from said element, and means for energizing the grid of said output tube from potential points along said element.

6. In a direct coupled electron tube system, the combination of a source of energy, a plurality of electron tubes, impedance output and input circuits coupling said tubes in cascade, means for energizing electrodes of said tubes from said source so that the cathode-plate impedance of each preceding tube is of the same order as the impedance input to the next succeeding tube of said cascade, means series related between the space current path of the last tube of said cascade and said source for determining the grid-bias of one or more tubes of said cascade, said means including a discharge tube having a plurality of electrodes, the cathode of which is series related between the space current path of said last tube and said source, another electrode being connected directly to the grid of one of the tubes of said cascade, and means for producing a potential across the space discharge path of said discharge tube, said discharge tube and associated circuits constituting a stage preceding said cascade.

7. In an electrical system, the combination of a source of energy, two series of a like number of electron tubes, impedance output and input circuits coupling said tubes of each series in cascade, means for energizing electrodes of said tubes from said source, means connecting said two series of tubes in parallel, and push-pull input and output circuits for said series of cascaded tubes.

8. In an electrical system, the combination of a source of energy, a plurality of vacuum tubes arranged in cascade, input and output circuits therefor, means for energizing a succeeding tube of said cascade from said source whereby the potential difference between the cathode and plate of said tube is greater than the potential difference between the plate and grid of said tube, and means for energizing a discharge path of at least one of the preceding tubes of said cascade from the potential developed between the grid and plate electrodes of said succeeding tube.

9. In an electrical system, the combination of a source of energy, a plurality of vacuum tubes arranged in cascade, input and output circuits for each of said tubes, means for energizing a succeeding tube from said source whereby current flows in the input circuit of said tube, and means for energizing the cathode-plate path of a preceding tube from the current flowing in said input circuit.

10. In an electrical system, the combination of a source of energy, a selective frequency system and an aperiodic system, each system having space discharge devices including grid and anode electrodes and space discharge paths, means for energizing said grid and anode electrodes of the discharge devices of said aperiodic system from said source, and means for energizing electrodes of the space discharge devices of said selective frequency system solely from the space discharge current of said aperiodic system.

11. In a cascaded electron tube system, the combination of a source of fluctuating unidirectional current energy, an output tube, means for energizing the space current path of said tube from said source, a second tube having an input circuit, a potential developing element series related between the space current path of said output tube and said source, means for energizing the electrodes of said second tube with current diverted from said potential developing element, and means associated with the input circuit of said second tube and said last mentioned means for commutating the fluctuations out of the space discharge current produced therein by energization from said source.

12. The method of modifiedly transmitting signal currents by means of a plurality of electron discharge tubes each having a cathode, grid, and anode, which consists in producing a space discharge through one of said tubes between the cathode and anode thereof, producing a second discharge through said tube between the cathode and grid thereof, energizing the space current path of a second tube thereby, and varying the impedance of the space current path of said second tube at signal frequency whereby the intensity of the first mentioned discharge is modulated at said frequency.

13. The method of energizing a cascaded electron tube system including an output amplifier tube and a second amplifier tube having a space discharge path, which consists in producing a discharge through said output tube and energizing the space discharge path of said second amplifier tube solely by current passing through said output tube.

14. The method of energizing a signaling system including an output tube which consists in passing the space current of said tube through a plurality of impedances in parallel, one of which has a coefficient of resistivity changeable with temperature differently from the rest, and varying the potential upon the grid of said tube relative to the cathode thereof as a function of the average intensity of the space current of said tube whereby the average intensity of space current of said tube is maintained substantially constant.

15. In an electrical system, the combination of a vacuum tube having grid, cathode and plate electrodes, means for establishing a plate current flow through said tube, a resistance in which a potential is developed by said plate current flow, connections for impressing said potential on the grid of said tube, and a circuit including a different potential developing impedance than said resistance for impressing a potential of opposed polarity on the grid of said tube.

16. In an electrical system, the combination of a vacuum tube having grid, cathode, screening grid and plate electrodes, means for establishing screening grid and plate current flows through said tube, means for combining said screening grid and plate current flows to develop a potential and for impressing said potential on the grid of said tube, and means for impressing a second potential of opposed polarity on the grid of said tube.

17. In an electrical system, the combination of a vacuum tube having grid, cathode and plate electrodes, means for establishing a plate current flow through said tube, an impedance connected to be traversed by said plate current for developing a potential with said plate current in excess of that required for biasing the grid of said tube, a circuit for impressing said excess potential negatively on said grid, a second impedance connected to be traversed by said plate current, and connections for impressing a second but positive potential from said second impedance on the grid of said tube.

18. In an electrical system, the combination of a vacuum tube having grid, cathode, and an additional plurality of cold electrodes, means for establishing current flows through said tube by way of said additional plurality of cold electrodes, means for combining said current flows to develop a potential and for impressing said potential negatively on the grid of said tube, a second source of potential, and connections for impressing the potential of said second source positively on the grid of said tube.

19. In an electrical system, the combination of a vacuum tube having grid, cathode and one or more additional cold electrodes, means for establishing current flows through said tube by way of said one or more additional cold electrodes, means for developing a potential with the resultant current flow by way of said one or more cold electrodes and impressing said potential on the grid of said tube, a second tube operatively associated with said first tube, means for establishing a current flow through said second tube, means for developing a potential from the said current flow through said second tube, and means for impressing on the grid of said first tube a potential from said second developed potential opposite in polarity to the potential impressed on said grid from said first developed potential.

20. In an electrical system, the combination of a plurality of electron tubes each having one hot and a plurality of cold electrodes, a source of alternating current, connections for activating said hot electrodes with said alternating current, means for rectifying and filtering said alternating current and energizing said cold electrodes with the resulting fluctuating direct current, aperiodic impedance elements connecting said tubes in cascade for operation as a system whereby said energizing with energy derived from said alternating current produces a residual of undesirable hum producing fluctuating currents, and means for selecting from a part of said system a fluctuating component of required value and phase and applying to a suitable portion of said cascaded system for neutralizing said hum production.

21. In an electrical system including a series of direct coupled cascaded thermionic tubes, a source of alternating current and means including a rectifying and filtering system for energizing said tubes for operation from said source, means for filtering the fluctuations in the resulting energizing currents away from the input circuit of the first of the tubes of said series, and means for selecting fluctuating current of determined phase and amplitude for introduction into the input circuit of the first tube of said series, whereby the residual hum producing current resulting from energizing the said system is neutralized.

22. In an electrical system, the combination of a source of energy, a plurality of groups of elements forming space discharge paths arranged in cascade relation, each of said groups having an electron emitting cathode, an anode and a control electrode, means for energizing the elements of one of said groups from said energy source whereby the potential difference between the cathode and anode elements thereof is greater than the potential difference between the anode and control electrode elements thereof, and connections for energizing the cathode and anode elements of a preceding group of elements in the cascade from the potential difference existing between the anode and control electrode elements of said first group of elements.

23. In an electrical system, the combination of a source of energy, a plurality of groups of elements forming space discharge paths, each of said groups having an electron emitting cathode, an anode and a control electrode, means for energizing the elements of one of said groups from said source whereby the differences of potential between the cathode and control electrode elements are different, connections for energizing the anode-cathode portion of another one of said groups of elements with the difference of potential developed across the anode-control electrode portion of said first group of elements, and means for effectively impressing upon the cathode-control electrode portion of said first group of elements potential variations developed in the cathode-anode portion of said second group of elements.

24. In an electrical system, the combination of a source of energy, a plurality of groups of elements forming space discharge paths, each of said groups having an electron emitting cathode, an anode and a control electrode, circuit connections for energizing the anode of one of said groups of elements positively with respect to its cathode from said source of energy, a connection between a point of positive potential in said anode energizing connection and the anode of another one of said group of elements, a connection between the cathode of said second group of elements and the control electrode of said first group of elements, and a high impedance connection between the cathode of said second group of elements and the cathode of said first group of elements.

25. In an electrical current amplifying system, the combination of a source of energy, a pair of groups of elements forming space discharge paths, each of said groups having an electron emitting cathode, and an anode and a control electrode, said groups having their electrodes so constructed and related that one is adapted for relatively large current capacity accompanied by a low order of amplification and the other is adapted for relatively small current capacity accompanied by a high order of amplification, circuit connections for positively energizing the anode-cathode portion of said large current group of elements from said source of energy, a connection between a point of positive potential in said anode energizing connection and the anode of said small current capacity group of elements, a connection between the cathode of said second group of elements and the control electrode of said first group of elements, a connection offering high impedance to electrical currents between the cathode of said second group of elements and the cathode of said first group of elements, and means for impressing electrical currents to be amplified on the cathode-control electrode portion of said second group of elements.

26. In an electrical system, the combination of a source of energy, a plurality of groups of elements forming space discharge paths, each of said groups having an electron emitting cathode, an anode and a control electrode, circuit connections for positively energizing the anode and negatively energizing the control electrode of one of said groups of elements from said source of energy, a connection between a point of positive potential in the anode energizing connection of said first group of elements and the anode of another one of said group of elements, a connection between the cathode of said second group of elements and the control electrode of said first group of elements, and an impedance connection between the cathode of said second group of elements and the cathode of said first group of elements.

27. In an electrical current amplifying system, the combination of a source of energy, a pair of groups of elements forming space discharge paths, each of said groups having an electron emitting cathode, an anode and a control electrode, circuit connections for positively energizing the anode electrode of one of said groups of elements from said source of energy, said connections including an output impedance element connected between the positive side of said source of energy and said anode, a connection between the positive side of said source and the anode of the other group of elements, a connection between the cathode of said second group of elements and the control electrode of said first group of elements, a connection offering high impedance to electrical currents between the cathode of said second group of elements and the cathode of said first group of elements, and means for impressing electrical currents on the cathode-control electrode portion of said second group of elements.

SIDNEY Y. WHITE.